(12) United States Patent
Shimada et al.

(10) Patent No.: US 12,069,213 B2
(45) Date of Patent: Aug. 20, 2024

(54) INFORMATION PROCESSING APPARATUS CAPABLE OF PREVENTING LOWERING OF OPERABILITY WHEN PRINTING IS PERFORMED, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Kazushige Shimada, Kanagawa (JP); Shinya Suzuki, Chiba (JP); Kazuyuki Saito, Kanagawa (JP); Akihiro Yasuda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/457,467

(22) Filed: Aug. 29, 2023

(65) Prior Publication Data
US 2024/0080396 A1 Mar. 7, 2024

(30) Foreign Application Priority Data
Sep. 2, 2022 (JP) ................. 2022-140192

(51) Int. Cl.
*H04N 1/00* (2006.01)
*H04N 1/32* (2006.01)

(52) U.S. Cl.
CPC ..... *H04N 1/00427* (2013.01); *H04N 1/00435* (2013.01); *H04N 1/00482* (2013.01); *H04N 1/00503* (2013.01); *H04N 1/32539* (2013.01)

(58) Field of Classification Search
CPC .......... H04N 1/00427; H04N 1/00435; H04N 1/00482; H04N 1/00503; H04N 1/32539; G06F 3/0485; G06F 2203/04808
See application file for complete search history.

(56) References Cited

U.S. PATENT DOCUMENTS

| | | | | |
|---|---|---|---|---|
| 8,860,996 | B2 * | 10/2014 | Kishida | G06F 3/1288 358/1.14 |
| 9,325,868 | B2 * | 4/2016 | Nishimura | H04N 1/00482 |
| 2021/0240412 | A1 | 8/2021 | Saigusa | |
| 2023/0333786 | A1 * | 10/2023 | Saito | G06F 3/1228 |
| 2023/0333792 | A1 * | 10/2023 | Shimada | H04L 67/303 |
| 2023/0333793 | A1 * | 10/2023 | Saito | G06F 3/1264 |
| 2023/0333794 | A1 * | 10/2023 | Yasuda | G06F 3/1205 |

(Continued)

FOREIGN PATENT DOCUMENTS

JP 2021124791 A 8/2021

*Primary Examiner* — Scott A Rogers
(74) *Attorney, Agent, or Firm* — ROSSI, KIMMS & McDOWELL LLP

(57) ABSTRACT

An information processing apparatus that is capable of preventing lowering of operability when printing is performed. In a client terminal, an OS acquires capability information related to printing capability from a server that provides a cloud print service or a printer, and a controller displays a screen. The capability information has a hierarchical structure including at least one item name and a plurality of attribute values belonging to the item name. The controller can perform first display for collectively displaying the item name and the attribute values and second display for displaying the plurality of attribute values in a state sorted into groups of attribute values relevant to each other.

15 Claims, 27 Drawing Sheets

(56) References Cited

U.S. PATENT DOCUMENTS

| | | | |
|---|---|---|---|
| 2024/0069818 A1* | 2/2024 | Yasuda | G06F 3/1253 |
| 2024/0086122 A1* | 3/2024 | Hanai | G06F 3/1253 |
| 2024/0121346 A1* | 4/2024 | Suzuki | G06F 3/1258 |
| 2024/0134584 A1* | 4/2024 | Yamamichi | G06F 3/1255 |

* cited by examiner

FIG. 5

| ITEM NAME (501) | ATTRIBUTE VALUE (502) |
|---|---|
| SHEET SIZE | A6/A5/A4/B5/LETTER/LEGAL/EXECUTIVE/POSTCARD/#10 ENVELOPE PORTRAIT/DL ENVELOPE PORTRAIT/ENVELOPE (SIDE-OPENING TYPE #4) PORTRAIT/ENVELOPE (Chou #3) PORTRAIT/ENVELOPE (Chou #4) PORTRAIT/ENVELOPE C5 PORTRAIT/ENVELOPE MONARCH PORTRAIT/L/4X6 (KG SIZE)/5X7/8X10-INCH SIZE/SQUARE(127 mm)/BUSINESS CARD(CARD)/ENVELOPE (SIDE OPENING-TYPE #6) PORTRAIT/SQUARE(89 mm)/SQUARE(4X4) |
| SHEET TYPE | ENVELOPE/LABEL/PLAIN PAPER/PHOTO PAPER/GLOSSY & STANDARD PHOTOGRAPHIC PAPER/SILKY-TONE PHOTOGRAPHIC PAPER/INKJET POSTCARD (COMMUNICATION SIDE)/INKJET POSTCARD (ADDRESS SIDE)/INKJET POSTCARD FOR PHOTO (COMMUNICATION SIDE)/INKJET POSTCARD FOR PHOTO (ADDRESS SIDE) |
| NUMBER OF COPIES | Max=99 |
| ORIENTATION OF SHEET | PORTRAIT/LANDSCAPE |
| PRINT QUALITY | STANDARD/ROUGH |
| PRINT BY COPIES | ON/OFF |
| STAPLING | NONE/AUTOMATIC/TOP LEFT/BOTTOM LEFT/TOP RIGHT/BOTTOM RIGHT/LEFT END (2 POSITIONS)/TOP (2 POSITIONS)/RIGHT END (2 POSITIONS)/BOTTOM (2 POSITIONS)/SADDLE-STITCH BINDING/BINDING WITHOUT STAPLE |
| PUNCHING | NONE/PUNCHED HOLES (AUTOMATIC)/PUNCHED HOLES (2 LEFT)/PUNCHED HOLES (3 LEFT)/PUNCHED HOLES (4 LEFT)/PUNCHED HOLES (MULTI LEFT)/PUNCHED HOLES (2 RIGHT)/PUNCHED HOLES (3 RIGHT)/PUNCHED HOLES (4 RIGHT)/PUNCHED HOLES (MULTI RIGHT)/PUNCHED HOLES (2 TOP)/PUNCHED HOLES (3 TOP)/PUNCHED HOLES (4 TOP)/PUNCHED HOLES (MULTI TOP)/PUNCHED HOLES (2 BOTTOM)/PUNCHED HOLES (3 BOTTOM)/PUNCHED HOLES (4 BOTTOM)/PUNCHED HOLES (MULTI BOTTOM) |
| FOLD SETTING | NONE/TWO-FOLD/C-FOLD/FOUR-FOLD/OUTER THEE-FOLD/Z-FOLD/SADDLE-FOLD (OUTPUT FROM SADDLE FINISHER) |
| COLOR MODE | COLOR/MONOCHROME |
| PAGE AGGREGATION | OFF/2in1/4in1/6in1/9in1/16in1 |
| ARRANGEMENT ORDER | FROM LEFT TO RIGHT/FROM RIGHT TO LEFT |
| MAGNIFICATION | NONE/ADUST TO PAGE LATERAL WIDTH/ADJUST TO SCREEN SIZE |
| DOUBLE-SIDED PRINTING | SINGLE-SIDED/DOUBLE-SIDED (SHORT SIDE-BINDING)/DOUBLE-SIDED (LONG SIDE-BINDING) |
| ROTATION BY 180 DEGREES | NONE/COUNTERCLOCKWISE ROTATION/CLOCKWISE ROTATION |
| SAVING OF JOB IN PRINTER | ON/OFF |
| ABBREVIATION OF JOB NAME | ON/OFF |
| BINDING WITHOUT STAPLE | ON/OFF |

FIG. 6A

```xml
<?xml version="1.0" encoding="utf-8"?>
<PrintDeviceCapabilities
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  version="2">
  <psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>                                                    ~601
  <psk:PageMediaSize psf2:psftype="Feature">   ~602
    <psk:ISOA4 psf2:psftype="Option">
      <psk12:PortraitImageableSize psf2:psftype="ImageableAreaType" psf2:psftype="Property">12700,12700,184600,271600</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>                                         ~603
    <psk:NorthAmericaLetter psf2:psftype="Option" psf2:default="true">
      <psk12:PortraitImageableSize psf2:psftype="ImageableAreaType" psf2:psftype="Property">12700,12700,193500,264000</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
  </psk:PageMediaSize>
  <psk:PageOrientation psf2:psftype="Feature">
    <psk:Landscape psf2:psftype="Option" />
    <psk:Portrait psf2:psftype="Option" psf2:default="true" />
  </psk:PageOrientation>
  ...............
  <psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</psk:DeviceBitsPerPixel>
      <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG. 6B1

```xml
<?xml version="1.0" encoding="UTF-8"?>
<PrintDeviceCapabilities
  xmlns:ns0000="http://schemas.microsoft.com/windows/2018/04/printing/printschemakeywords/lpp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<!--copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>

<!--media-default, media-supported, media-col-database -->
  <psk:PageMediaSize psf2:psftype="Feature">
    <psk:JapanHagakiPostcard psf2:psftype="Option" psf2:default="false">
      <psk:MediaSizeWidth xsi:type="xsd:integer" psf2:psftype="ScoredProperty">100000</psk:MediaSizeWidth>
      <psk:MediaSizeHeight xsi:type="xsd:integer" psf2:psftype="ScoredProperty">148000</psk:MediaSizeHeight>
      <psk12:PortraitImageableSize xsi:type="psf2:ImageableAreaType" psf2:psftype="Property">3400,5000,93200,138000</psk12:PortraitImageableSize>
      <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
      <psk:MediaSizeWidth xsi:type="xsd:integer" psf2:psftype="ScoredProperty">148000</psk:MediaSizeWidth>
      <psk:MediaSizeHeight xsi:type="xsd:integer" psf2:psftype="ScoredProperty">210000</psk:MediaSizeHeight>
      <psk12:PortraitImageableSize xsi:type="psf2:ImageableAreaType" psf2:psftype="Property">3400,5000,141200,200000</psk12:PortraitImageableSize>
      <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
      <psk:MediaSizeWidth xsi:type="xsd:integer" psf2:psftype="ScoredProperty">210000</psk:MediaSizeWidth>
      <psk:MediaSizeHeight xsi:type="xsd:integer" psf2:psftype="ScoredProperty">297000</psk:MediaSizeHeight>
      <psk12:PortraitImageableSize xsi:type="psf2:ImageableAreaType" psf2:psftype="Property">3400,5000,203200,287000</psk12:PortraitImageableSize>
      <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">279400</psk:MediaSizeHeight>
      <psk12:PortraitImageableSize xsi:type="psf2:ImageableAreaType" psf2:psftype="Property">6400,5000,203200,269400</psk12:PortraitImageableSize>
      <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
      <psk:MediaSizeWidth xsi:type="xsd:integer" psf2:psftype="ScoredProperty">105000</psk:MediaSizeWidth>
      <psk:MediaSizeHeight xsi:type="xsd:integer" psf2:psftype="ScoredProperty">235000</psk:MediaSizeHeight>
      <psk12:PortraitImageableSize xsi:type="psf2:ImageableAreaType" psf2:psftype="Property">5500,8000,93800,214300</psk12:PortraitImageableSize>
      <psk12:BorderlessImageableSize xsi:type="psf2:ImageableAreaType" psf2:psftype="Property">0,0,105000,235000</psk12:BorderlessImageableSize>
    </psk:JapanYou4Envelope>
    <psk:NorthAmericaLegal psf2:psftype="Option" psf2:default="false">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">355600</psk:MediaSizeHeight>
      <psk12:PortraitImageableSize xsi:type="psf2:ImageableAreaType" psf2:psftype="Property">6400,5000,203200,345600</psk12:PortraitImageableSize>
      <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
      <psk:MediaSizeWidth xsi:type="xsd:integer" psf2:psftype="ScoredProperty">182000</psk:MediaSizeWidth>
      <psk:MediaSizeHeight xsi:type="xsd:integer" psf2:psftype="ScoredProperty">257000</psk:MediaSizeHeight>
      <psk12:PortraitImageableSize xsi:type="psf2:ImageableAreaType" psf2:psftype="Property">3400,5000,175200,247000</psk12:PortraitImageableSize>
      <psk12:BorderlessImageableSize xsi:type="psf2:ImageableAreaType" psf2:psftype="Property">0,0,182000,257000</psk12:BorderlessImageableSize>
    </psk:JISB5>
  </psk:PageMediaSize>
```

*FIG. 6B2*

```
<!--orientation-requested-default -->
<psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
</psk:PageOrientation>

..................

<!--finishings-default, finishings-supported -->
<psk:JobStapleAllDocuments psf2:psftype="Feature">
    <psk:None psf2:psftype="Option" psf2:default="true"/>
    <psk:StapleTopLeft psf2:psftype="Option" psf2:default="false"/>
    <psk:StapleTopRight psf2:psftype="Option" psf2:default="false"/>
    <psk:StapleBottomLeft psf2:psftype="Option" psf2:default="false"/>
    <psk:StapleBottomRight psf2:psftype="Option" psf2:default="false"/>
    <psk:StapleDualLeft psf2:psftype="Option" psf2:default="false"/>
    <psk:StapleDualTop psf2:psftype="Option" psf2:default="false"/>
    <psk:StapleDualRight psf2:psftype="Option" psf2:default="false"/>
    <psk:StapleDualBottom psf2:psftype="Option" psf2:default="false"/>
    <psk:SaddleStitch psf2:psftype="Option" psf2:default="false"/>
</psk:JobStapleAllDocuments>

<!--sides-default, sides-supported -->
<psk:JobDuplexAllDocumentsContiguously psf2:psftype="Feature">
    <psk:OneSided psf2:psftype="Option" psf2:default="true"/>
    <psk:TwoSidedShortEdge psf2:psftype="Option" psf2:default="false"/>
    <psk:TwoSidedLongEdge psf2:psftype="Option" psf2:default="false"/>
</psk:JobDuplexAllDocumentsContiguously>

<!--print-color-mode-default, print-color-mode-supported, pwg-raster-document-type-supported -->
<psk:PageOutputColor psf2:psftype="Feature">
    <psk:Color psf2:psftype="Option" psf2:default="true"/>
    <psk:Grayscale psf2:psftype="Option" psf2:default="false"/>
    <psk:Monochrome psf2:psftype="Option" psf2:default="false"/>
</psk:PageOutputColor>
</PrintDeviceCapabilities>
```

[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%            701
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
                    702              703

PRINTING ORIENTATION
[VERTICAL ▽]

DOUBLE-SIDED PRINTING
[SINGLE-SIDED ▽]

PAGE ORDER
[ASCENDING ORDER ▽]

PRINT QUALITY
[STANDARD ▽]

DETAILED SETTING — 901

[APPLY] — 903
[CANCEL] — 904
[OK] — 905

SHEET SIZE
[A4 ▽]

NUMBER OF COPIES
[1]

COLOR PRINT MODE
[COLOR ▽]

SHEET TYPE
[STANDARD ▽]

[OK] — 902
[CANCEL]

MARGINLESS PRINTING
NONE ▷

RESOLUTION
300dpi ▷

SCALING
NONE ▷

STAPLING
NONE ▷

906

OK   CANCEL

FOLD SETTING
NONE ▷

PUNCHING
NONE ▷

DISCHARGE OUTLET
AUTOMATICALLY SELECTED ▽

Nup
2 ▷

906

OK   CANCEL

FIG. 10A

OUTPUT SHEET SIZE
A4 ▷ — 1001

SHEET TYPE
PLAIN PAPER

NUMBER OF COPIES
1

ORIENTATION OF SHEETS
● PORTRAIT ○ LANDSCAPE

PRINT QUALITY
STANDARD ▷

OK — 1002    CANCEL 1003
100

FIG. 10B

PRINT BY COPIES
OFF ▷

STAPLING
TOP LEFT ▷

PUNCHING
NONE ▷

FOLD SETTING
NONE ▷

COLOR MODE
COLOR ▷

OK    CANCEL

ROTATION BY 180 DEGREES
NONE

SAVING OF JOB IN PRINTER
OFF

ABBREVIATION OF JOB NAME
OFF

OK    CANCEL

PAGE AGGREGATION
2in1

ARRANGEMENT ORDER
FROM LEFT TO RIGHT

MAGNIFICATION
NONE

DOUBLE-SIDED PRINTING
DOUBLE-SIDED

BINDING DIRECTION
LONG SIDE-BINDING

OK    CANCEL 1003
1006
1004
1007
1005

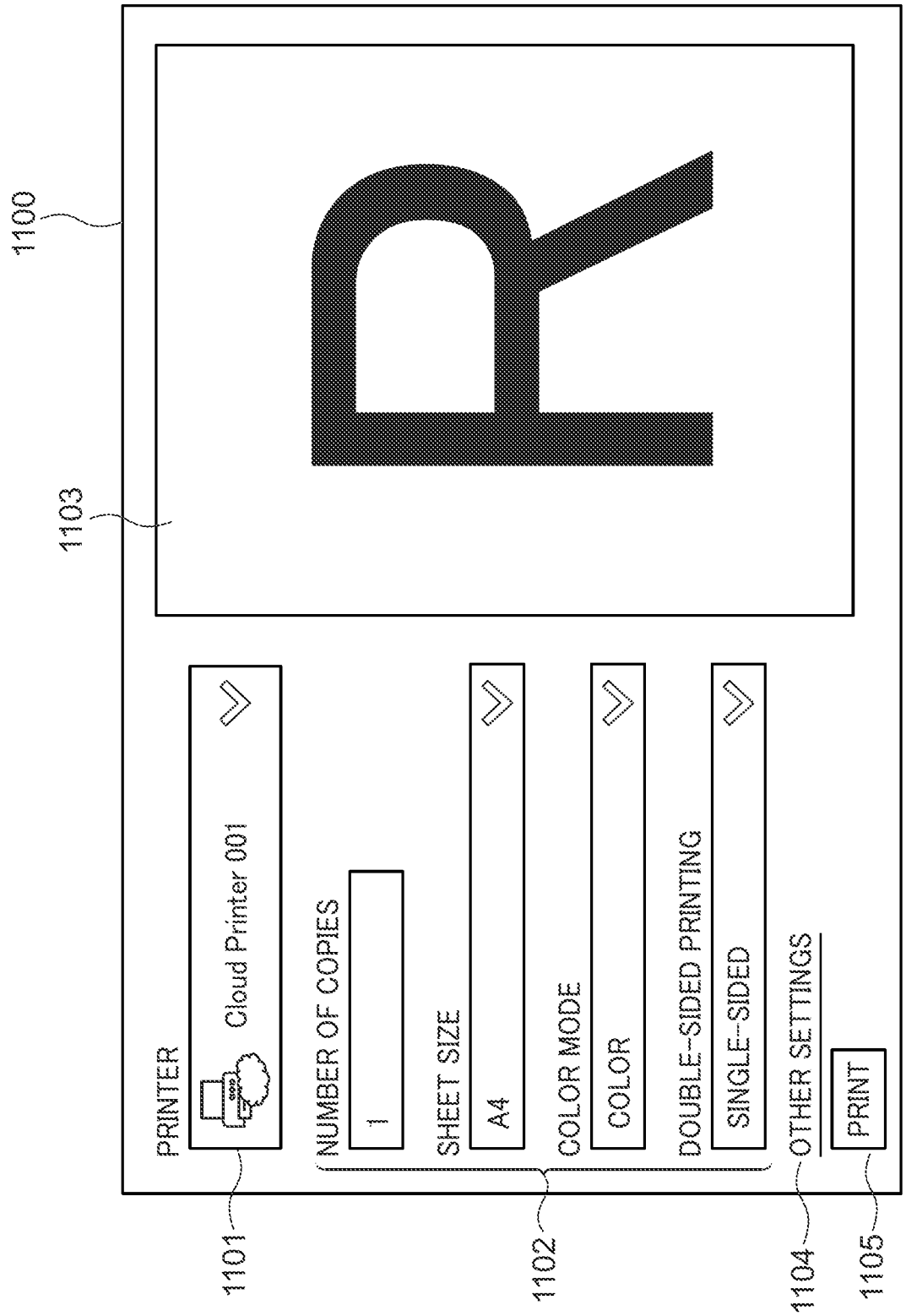

INFORMATION PROCESSING APPARATUS CAPABLE OF PREVENTING LOWERING OF OPERABILITY WHEN PRINTING IS PERFORMED, METHOD OF CONTROLLING INFORMATION PROCESSING APPARATUS, AND STORAGE MEDIUM

BACKGROUND OF THE INVENTION

Field of the Invention

The present invention relates to an information processing apparatus that is capable of preventing lowering of operability when printing is performed, a method of controlling the information processing apparatus, and a storage medium.

Description of the Related Art

In recent years, a general-purpose printer driver has been designed which operates based on an industry-standard protocol, such as the Internet Printing Protocol (IPP). Examples of the general-purpose printer driver include a local printer driver that transmits print data directly to a printer (image forming apparatus) and a cloud printer driver that transmits print data via a cloud print service. Further, the general-purpose printer driver can communicate with printers provided by a plurality of printer vendors. This makes it possible to transmit print data to a printer or a cloud print service without installing a printer driver specific to a printer vendor. Therefore, the general-purpose printer driver can be compatible with print jobs executed by printers of a variety of printer vendors, respectively, but on the other hand, items which can be set as print settings and functions are sometimes limited. To cope with this, as an apparatus that eliminates this limitation, for example, there has been proposed an apparatus that acquires a driver extension package (print extension application) for extending the functions of the driver (see e.g. Japanese Laid-Open Patent Publication (Kokai) No. 2021-124791). The apparatus described in Japanese Laid-Open Patent Publication (Kokai) No. 2021-124791 updates, when the driver extension package is acquired, a database of a printer in a case where information included in the driver extension package is newer than information already registered in the database. With this, the user can use a print settings user interface (UI) and a print job-editing function, which are specific to each printer vendor.

In the general-purpose printer driver, after the information is updated, e.g. for double-sided printing, selection items of "double-sided printing ON/OFF", "short side-binding for binding direction of double-sided printing", and "long side-binding for binding direction of double-sided printing" are displayed in a display form in which these selection items are collectively received in a single combo box. This display form is different from a display form which general users are familiar with and in which selection items of "double-sided printing" and "single-sided printing" are received in one combo box, and selection items of "short side-binding" and "long side-binding" are received in another combo box. As a result, there is a possibility that the operability of selection of an item for double-sided printing is lowered.

SUMMARY OF THE INVENTION

The present invention provides an information processing apparatus that is capable of preventing lowering of operability when printing is performed, a method of controlling the information processing apparatus, and a storage medium.

In a first aspect of the present invention, there is provided an information processing apparatus including at least one processor, and a memory coupled to the at least one processor, the memory having instructions that, when executed by the processor, perform the operations as an acquisition unit configured to acquire capability information related to print capability from a server that provides a cloud print service or from a printer; and a display control unit configured to display a screen, wherein the capability information has a hierarchical structure including at least one item of first information and a plurality of items of second information belonging to the item of the first information, and wherein the display control unit can perform first display for collectively displaying the item of the first information and the plurality of items of the second information, and second display for displaying the plurality of items of the second information in a state sorted into groups of items relevant to each other of the second information.

In a second aspect of the present invention, there is provided a method of controlling an information processing apparatus that processes information, including acquiring capability information related to print capability from a server that provides a cloud print service or from a printer; and displaying a screen, wherein the capability information has a hierarchical structure including at least one item of first information and a plurality of items of second information items belonging to the item of the first information, and wherein the displaying of the screen can be executed by first display for collectively displaying the item of the first information and the plurality of items of the second information, and second display for displaying the plurality of items of the second information in a state sorted into groups of items relevant to each other of the second information.

According to the present invention, it is possible to prevent lowering of the operability when printing is performed.

Further features of the present invention will become apparent from the following description of exemplary embodiments (with reference to the attached drawings).

BRIEF DESCRIPTION OF THE DRAWINGS

FIG. 5 is a table showing an example of capability information.

FIG. 6A is a diagram showing an example of device capability information in an initial state, packed with an OS.

FIGS. 6B1 and 6B2 are diagrams each showing an example of the device capability information updated by using capability information acquired from a cloud print service.

FIG. 7 is a diagram showing an example of an extension setup information file.

FIGS. 9A to 9D are diagrams each showing an example of a print settings screen displayed in a case where the print settings extension application has not been installed.

FIGS. 10A to 10I are diagrams each showing an example of a print settings screen displayed in a case where the print settings extension application has been installed.

FIG. 11 is a diagram showing an example of a print settings screen displayed by a document creation application.

DESCRIPTION OF THE EMBODIMENTS

The present invention will now be described in detail below with reference to the accompanying drawings showing embodiments thereof. However, the configuration of the following embodiment is given only by way of example, and is by no means intended to limit the scope of the present invention. For example, each component of the present invention can be replaced by a desired component which can perform the same function. Further, a desired component may be added.

Figure 1:
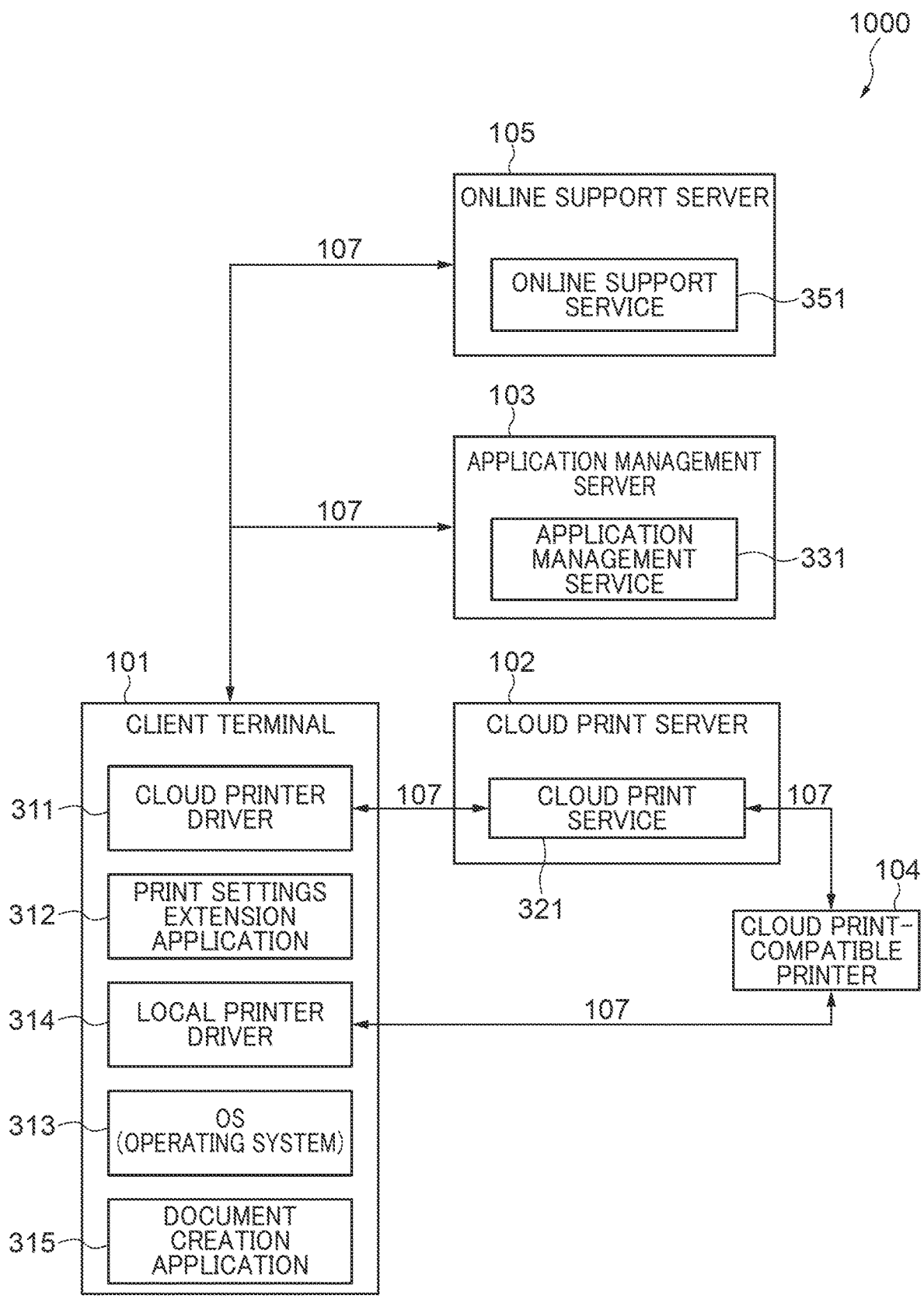
FIG. 1 is a schematic block diagram showing a configuration of a printing system.

FIG. 1 is a schematic block diagram showing a configuration of a printing system. As shown in FIG. 1, the printing system, denoted by reference numeral 1000, includes a client terminal 101, a cloud print server 102, an application management server 103, a cloud print-compatible printer 104, and an online support server 105. These apparatuses are connected via a network 107 such that they are communicable with one another. The client terminal 101 is an information processing apparatus as a terminal operated by a user, such as a personal computer (PC), a tablet terminal, or a smartphone. The client terminal 101 has an operating system (OS) 313. On the OS 313, a cloud printer driver 311, a print settings extension application (print settings application) 312, a local printer driver 314, and a document creation application 315 described hereinafter with reference to FIG. 8, can be executed. The cloud printer driver 311 and the local printer driver 314 are general-purpose printer drivers (OS-standard printer drivers) which have been installed in advance or are installed after the client terminal 101 is purchased, for example. The print settings extension application 312 is installed in the client terminal 101 from an application management service 331 of the application management server 103. The print settings extension application 312 is application software for extending functions of the cloud printer driver 311 and the local printer driver 314. Therefore, this print settings extension application 312 is a program for causing a CPU 212 of the client terminal 101 to execute a method of controlling the information processing apparatus. That is, the print settings extension application 312 is a program for causing the CPU 212 (client terminal 101) to execute acquisition of capability information, described hereinafter, and control of display.

The cloud print-compatible printer 104 is an image forming apparatus that performs printing on a recording medium, such as a sheet. In the printing system 1000, the cloud print-compatible printer 104 converts print data received via the network 107 to image data and prints the image data on a recording medium. The cloud print-compatible printer 104 can receive print data from the client terminal 101 via the cloud print server 102 or directly receive print data from the client terminal 101 without using the cloud print server 102. With this, the cloud print-compatible printer 104 can receive print data generated by the cloud printer driver 311 of the client terminal 101 via the cloud print server 102. Further, the cloud print-compatible printer 104 can receive print data generated by the local printer driver 314 of the client terminal 101 without using the cloud print server 102.

The cloud print server 102 is a server that provides a cloud print service 321. More specifically, the cloud print server 102 receives a print instruction and print data from an external apparatus, such as the client terminal 101. Then, the cloud print server 102 transmits the received print data to the cloud print-compatible printer 104 which is predetermined. The application management server 103 is a server that provides the application management service 331 and holds and manages a variety of applications. The application management server 103 receives identification information of an application and a download request for the application from the client terminal 101. Then, the application management server 103 transmits the application identified based on the received identification information to the client terminal 101. The online support server 105 is a server that provides an online support service 351. The online support service 351 can provide an extension setup information file 700 in which information for extending the functions of the client terminal 101 has been described, to the client terminal 101. As the network 107, there may be used, for example, a local area network (LAN) or a wide area network (WAN), depending on a use environment of the printing system 1000.

Note that although the client terminal 101 and the cloud print-compatible printer 104 are each singly arranged in the present embodiment, this is not limitative, but they may be each arranged in plural. Further, the cloud print server 102, the application management server 103, and the online support server 105 may be each formed by one server or a plurality of servers. In a case where the cloud print server 102, the application management server 103, and the online support server 105 are each formed by a plurality of servers, the processing loads can be distributed. The cloud print server 102, the application management server 103, and the online support server 105 may be incorporated in a single server.

Figure 2A:
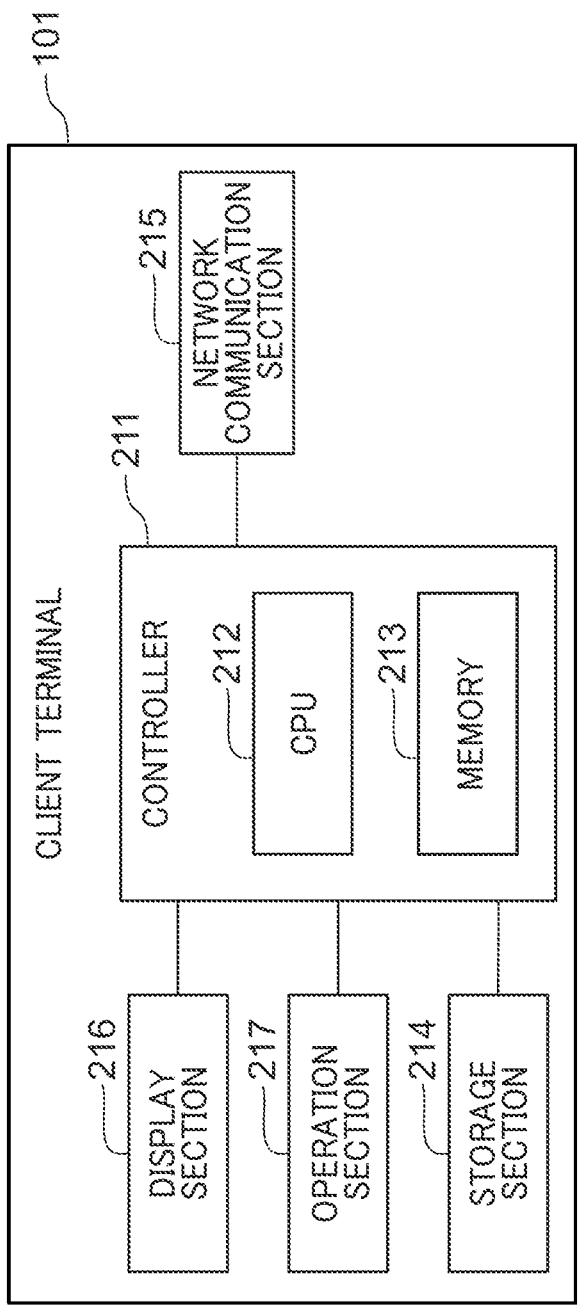
FIG. 2A is a block diagram showing a hardware configuration of a client terminal appearing in FIG. 1.

FIGS. 2A to 2E are block diagrams showing examples of respective hardware configurations of the apparatuses included in the printing system shown in FIG. 1. FIG. 2A is a block diagram showing a hardware configuration of the client terminal. As shown in FIG. 2A, the client terminal 101 includes a controller 211, a storage section 214, a network communication section 215, a display section 216, and an operation section 217. The controller 211 is formed by the CPU 212 and a memory 213 and controls the overall operation of the client terminal 101. The CPU 212 is a computer that loads programs stored in the storage section 214 into the memory 213 and executes the loaded programs. The memory 213 is a main storage memory for the CPU 212 and is used as a work area and a temporary storage area for loading a variety of programs. The storage section 214 is a nonvolatile storage device, such as a hard disk drive (HDD) or a solid-state drive (SSD), which is capable of storing digital data and having the digital data rewritten. The network communication section 215 is a device that performs communication with an external device via the network 107. The network communication section 215 can input and output digital data to and from e.g. the client terminal 101 via the network 107. The display section 216 is a device that is implemented e.g. by a liquid crystal display and displays visual information on a screen to a user on a real-time basis. The screen display performed by the display section 216 is controlled by the controller 211 (display control unit). The operation section 217 is a device that is formed e.g. by a keyboard and a mouse and receives an input from a user. Note that the client terminal 101 may include a device, such as a touch panel, which have both functions of the display section 216 and the operation section 217.

Figure 2B:
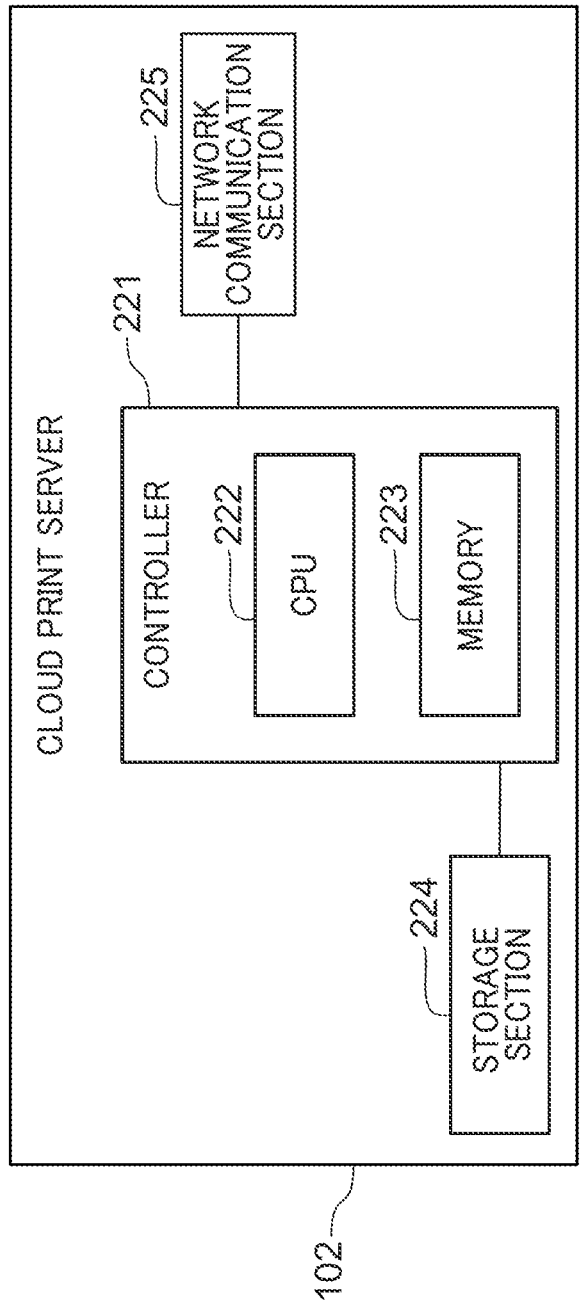
FIG. 2B is a block diagram showing a hardware configuration of a cloud print server appearing in FIG. 1.

FIG. 2B is a block diagram showing a hardware configuration of the cloud print server. As shown in FIG. 2B, the cloud print server 102 includes a controller 221 comprised of a CPU 222 and a memory 223, a storage section 224, and a network communication section 225. The controller 221, the storage section 224, and the network communication section 225 are the same as those of the client terminal 101, and hence description thereof is omitted.

Figure 2C:
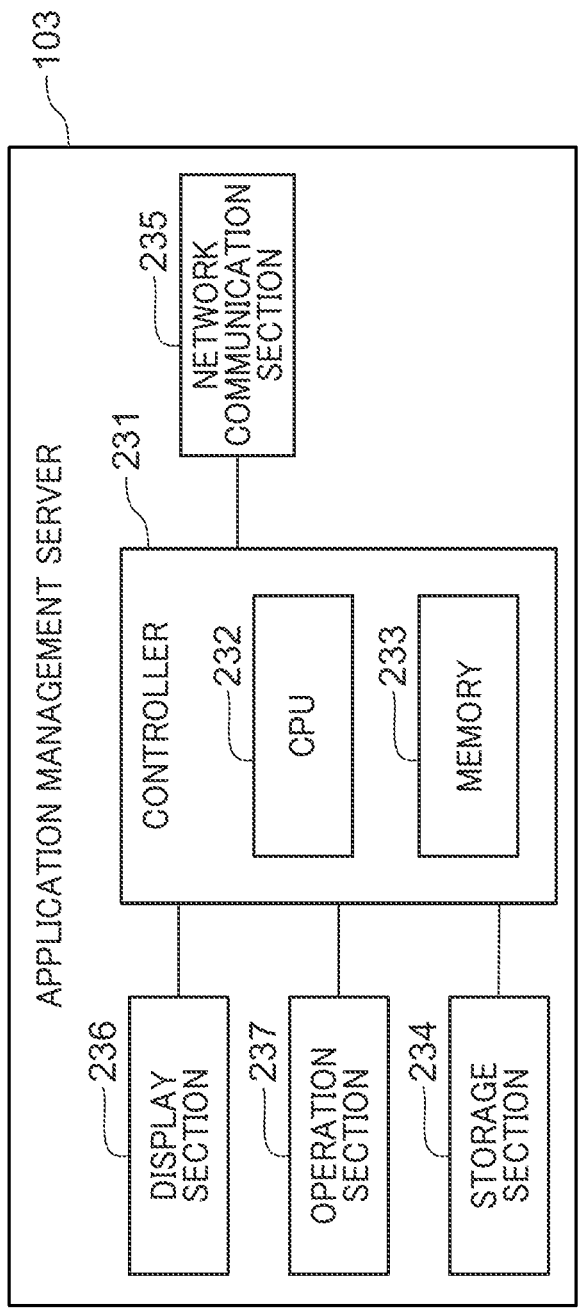
FIG. 2C is a block diagram showing a hardware configuration of an application management server appearing in FIG. 1.

FIG. 2C is a block diagram showing a hardware configuration of the application management server. As shown in FIG. 2C, the application management server 103 includes a controller 231 comprised of a CPU 232 and a memory 233, a storage section 234, a network communication section 235, a display section 236, and an operation section 237. The controller 231, the storage section 234, the network communication section 235, the display section 236, and the operation section 237 are the same as those of the client terminal 101, and hence description thereof is omitted.

Figure 2D:
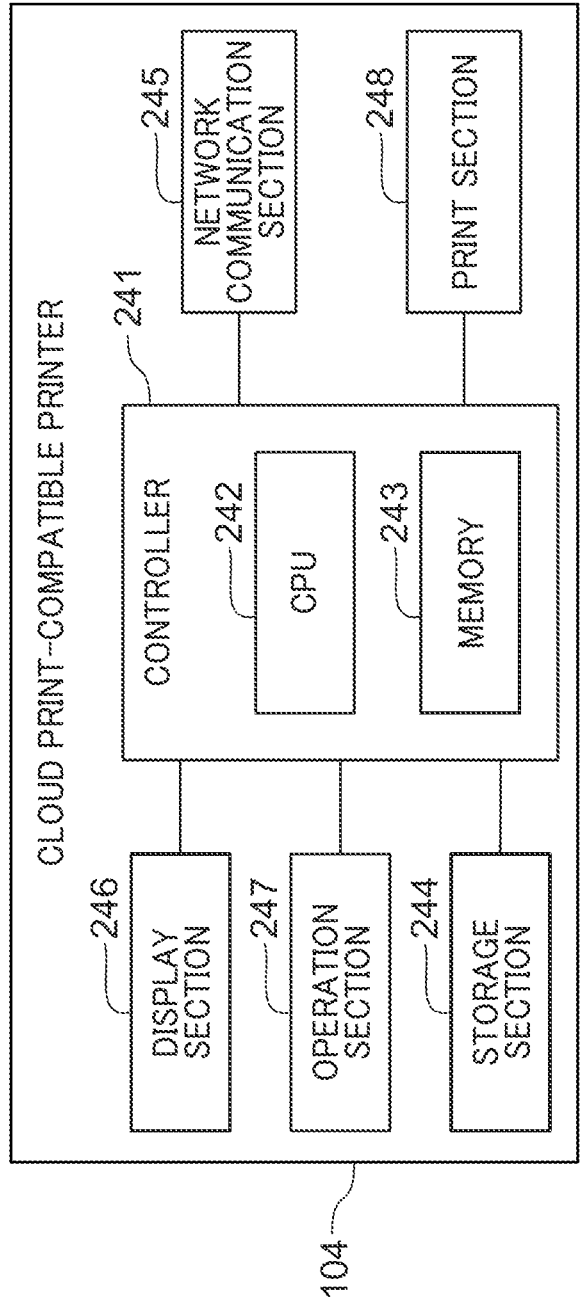
FIG. 2D is a block diagram showing a hardware configuration of a cloud print-compatible printer appearing in FIG. 1.

FIG. 2D is a block diagram showing a hardware configuration of the cloud print-compatible printer. As shown in FIG. 2D, the cloud print-compatible printer 104 includes a controller 241 comprised of a CPU 242 and a memory 243, a storage section 244, a network communication section 245, a display section 246, an operation section 247, and a print section 248. The controller 241 and the storage section 244 are the same as those of the client terminal 101, and hence description thereof is omitted. The network communication section 245 is a device that performs communication with an external apparatus via the network 107. The network communication section 245 mainly plays a roll of receiving print data and transmitting information on a state of the cloud print-compatible printer 104, such as an error state, to an external apparatus, such as the cloud print server 102. The display section 246 is a device that is formed e.g. by a touch panel and an LED and displays visual information to a user on a real-time basis. The operation section 247 is a device for receiving an input from a user, which is configured, for example, to include a touch panel, and further, hard keys, such as numeric keys. The print section 248 is a device that performs print processing by performing a series of operations of sheet feeding, printing, and sheet discharging with respect to a sheet (recording medium) fed from a cassette or tray. The printing method is not particularly limited, and for example, an electrophotographic method or an inkjet method can be used. Further, the print section 248 also includes a double-sided unit and a finishing device e.g. for stapling or punching, which are used when discharging a sheet. Although the cloud print-compatible printer 104 is a single-function printer that performs only the print function in the present embodiment, this is not limitative, but for example, the cloud print-compatible printer 104 may be a multifunction printer (MFP) that is further equipped with a scanner function and a facsimile (FAX) function.

Figure 2E:
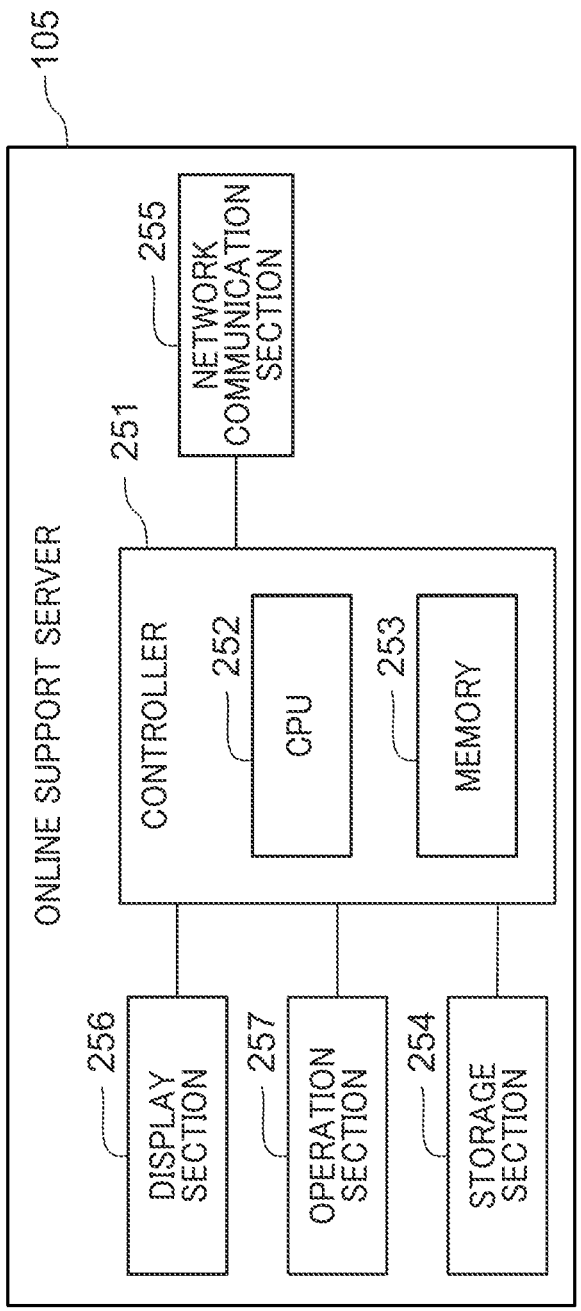
FIG. 2E is a block diagram showing a hardware configuration of an online support server appearing in FIG. 1.

FIG. 2E is a block diagram showing a hardware configuration of the online support server. As shown in FIG. 2E, the online support server 105 includes a controller 251, a storage section 254, a network communication section 255, a display section 256, and an operation section 257. The controller 251 is comprised of a CPU 252 and a memory 253 and controls the overall operation of the online support server 105. The CPU 252 is a computer that loads programs into the memory 253 and executes the loaded programs. The storage section 254 is a nonvolatile storage device, such as an HDD or an SSD. In the storage section 254, an extension setup information file to be provided to the client terminal 101 is stored. The extension setup information file is a file describing information for extending the functions of the client terminal 101. The network communication section 255 is an interface used by the online support server 105 to communicate with the client terminal 101. The online support server 105 receives a request for acquiring a file stored in the storage section 254 via the network communication section 255. Then, the online support server 105 transmits the file corresponding to the received request to the client terminal 101. The display section 256 and the operation section 257 are the same as those of the client terminal 101, and hence description thereof is omitted.

Figure 3:
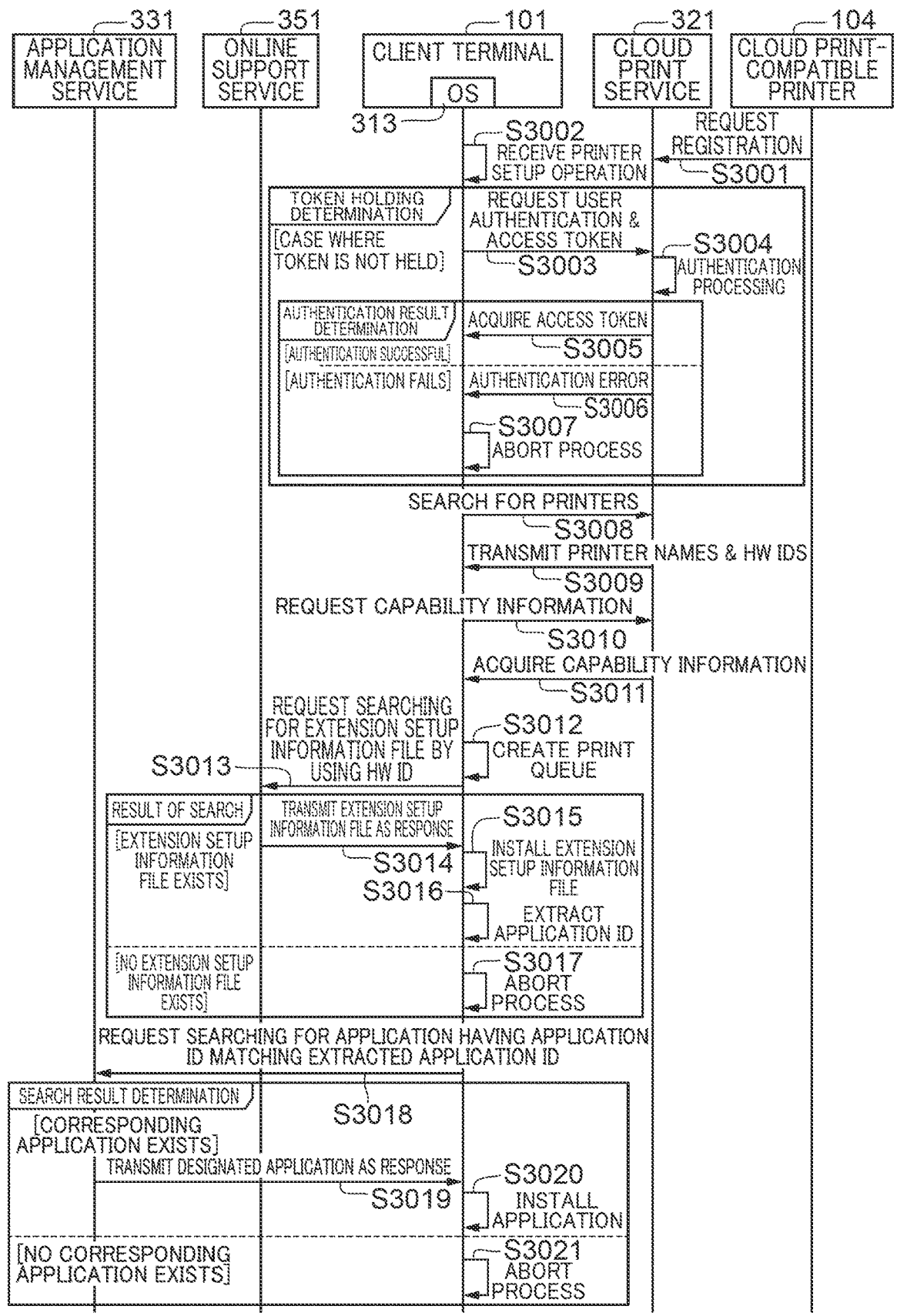
FIG. 3 is a sequence diagram of a process for installing a print settings extension application.

A processing sequence executed between the application management service 331, the online support service 351, the OS 313 of the client terminal 101, the cloud print service 321, and the cloud print-compatible printer 104 will be described with reference to FIG. 3. FIG. 3 is a sequence diagram showing a process for installing the print settings extension application. First, the cloud print-compatible printer 104 receives a printer registration operation for registering the cloud print-compatible printer 104 with the cloud print service 321 from a user. As shown in FIG. 3, in a step S3001, the cloud print-compatible printer 104 transmits a printer registration request together with device identification information to the cloud print service 321. The device identification information is information for identifying the cloud print-compatible printer 104, and the information is e.g. an HW ID (hardware identifier) assigned to each printer model, but is not limited to this.

Upon receipt of the registration request in the step S3001, the cloud print service 321 transmits a uniform resource locator (URL) of the cloud print service 321, for printer registration, to the cloud print-compatible printer 104. With this, the user can access this URL by operating the cloud print-compatible printer 104. Then, an input screen for inputting a user ID and a password to use the cloud print service 321 is displayed on the display section 246 of the cloud print-compatible printer 104. The user inputs the user ID and the password via the operation section 247 of the cloud print-compatible printer 104 and logs in to the cloud print service 321. If the login is successful, the cloud print service 321 transmits a request for acquiring information necessary for registering the printer, to the cloud print-compatible printer 104. The cloud print-compatible printer 104 transmits information on the cloud print-compatible printer 104 (the printer information) to the cloud print service 321 in response to the request.

The cloud print service 321 having received the printer registration request in the step S3001 registers the information on the cloud print-compatible printer 104 and creates a print queue for the cloud print-compatible printer 104. At this time, the cloud print service 321 acquires the capability information of the cloud print-compatible printer 104. Then, the cloud print service 321 associates the capability information with the print queue. The "capability information" is information on the print capability of the cloud print-compatible printer 104, i.e. information necessary for a user to set print settings when performing printing. The capability information is not particularly limited, and there may be mentioned, for example, double-sided printability information, color printability information, and stapling executability information, as the capability information.

FIG. 5 is a table showing an example of the capability information. For example, the capability information shown in FIG. 5 has been stored in the storage section 244 of the cloud print-compatible printer 104. The capability information has a hierarchical structure including item names (items) 501 as first information and a plurality of attribute values 502 as second information belonging to each item of the first information. Although the plurality of item names (items) 501 are included in the present embodiment, it is only required to include at least one. Each item name 501 corresponds to a setting item of a print setting. Each attribute value 502 corresponds to a setting, an option, and a range that can be set for each setting item. The item names 501 include item names defined as industry standard specifications by the Internet Printing Protocol (IPP) as a communication protocol, and item names uniquely (specifically) defined by the printer vendor. Similarly, the attribute values 502 include attribute values defined by the IPP and attribute values uniquely defined by the printer vendor.

As shown in FIG. 5, among the item names 501, for example, "double-sided printing" is an item name defined by the IPP. The attribute values 502 belonging to (associated with) "double-sided printing" include "single-sided" (double-sided printing is disabled), "double-sided (short-side binding)" (short-side binding in double-sided printing), and "double-sided (long-side binding)" (long-side binding in double-sided printing). Further, among the item names 501, "saving of job in printer", "abbreviation of job name", and "binding without staple" are item names uniquely defined by the printer vendor. The attribute values 502 belonging to "saving of job in printer", "abbreviation of job name", and "binding without staple" include "ON" and "OFF", which are the attribute values also uniquely defined by the printer vendor. The item name of "saving of job in printer" is the name of an item for setting whether or not to save print data received by the cloud print-compatible printer 104 (hereinafter sometimes simply referred to as the "printer") from the cloud print service 321 even after printing the print data. The item name of "abbreviation of job name" is the name of an item for setting whether or not to display the name given to print data in an abbreviated form when the cloud print-compatible printer 104 displays the bibliographic information of the print data received from the cloud print service 321 on the display section 246. The item name of "binding without staple" is the name of an item for setting whether or not to bind sheets output based on print data received by the cloud print-compatible printer 104 from the cloud print service 321 without using a staple. The processing for "binding sheets without using a staple" refers to processing for binding sheets e.g. by crimping the sheets. Note that as an attribute value 502 associated with an item name 501 defined as an industry standard specification, an attribute value specific to the printer vendor may be defined. For example, "fold setting" is an item name 501 defined by the IPP. On the other hand, "saddle folding" which is one of the attribute values 502 for "fold setting" refers to processing for folding and discharging one or more sheets together without binding them with staples, and is an attribute value uniquely defined by the printer vendor.

In the present embodiment, it is assumed that the cloud print-compatible printer 104 notifies the cloud print service 321 of the capability information according to the IPP. The cloud print-compatible printer 104 registers the capability information using a command made available in advance in the cloud print service 321 so as to register the capability information. The cloud print-compatible printer 104 notifies the cloud print service 321 of the item names 501, the attribute values 502 associated with each item name 501, and default values. The capability information to be notified here may have item names 501 and attribute values 502 which are defined or not defined by the IPP. For example, the item names 501 of "saving of job in printer", "abbreviation of job name", and "binding without staple" which are not defined by the IPP are also notified to the cloud print service 321 for registration. Further, "saddle folding" which is one of the attribute values 502 for "fold setting" and is an attribute value specifically defined by the printer vendor is also notified to the cloud print service 321 for registration.

Figure 4:
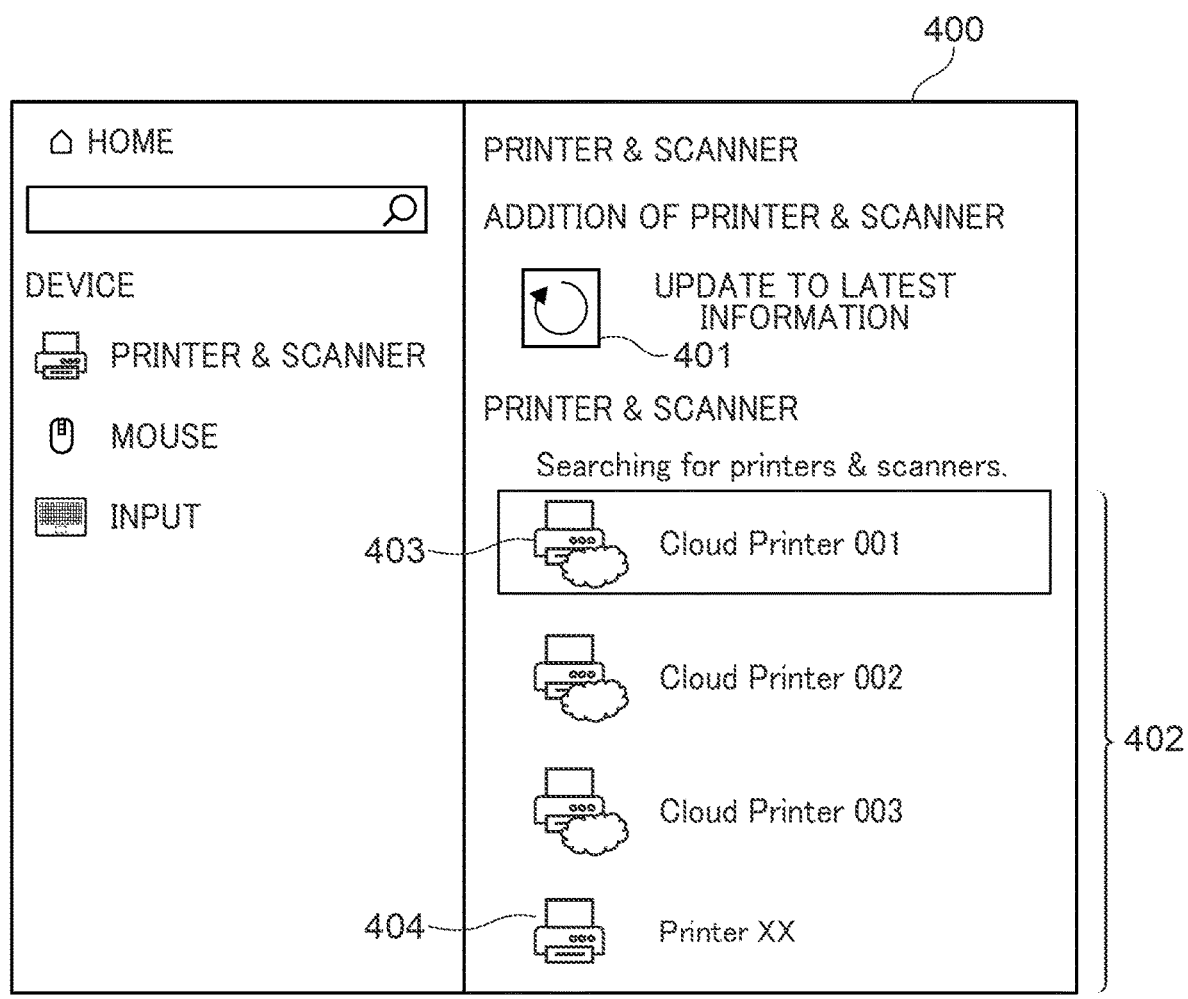
FIG. 4 is a diagram showing a setup operation screen related to printers registered with the client terminal.

When registering the cloud print-compatible printer 104 with the client terminal 101, a standard print function which is one of the functions of the OS 313 of the client terminal 101 is used. As shown in FIG. 3, in a step S3002 after execution of the step S3001, the OS 313 (controller 211) of the client terminal 101 receives a setup operation for performing printing in the cloud print-compatible printer 104. This setup operation is performed by the user operating a screen 400 (see FIG. 4) displayed on the display section 216 of the client terminal 101. FIG. 4 is a screen related to the printers registered with the client terminal. As shown in FIG. 4, the screen 400 includes an object 401, an area 402, an icon 403, and an icon 404. When the user selects the object 401, a printer search instruction is input to the OS 313. The OS 313 having received the printer search instruction determines whether or not the OS 313 holds an access token for the cloud print service 321. As a result of this determination, if it is determined that the OS 313 holds the access token (token), the OS 313 displays an input screen for inputting user information (a login name and a password), not shown, on the display section 216. On the other hand, if it is determined that the OS 313 holds the access token, the process proceeds to a step S3008.

In a step S3003, the OS 313 of the client terminal 101 transmits the user information input via the input screen to the cloud print service 321 to request user authentication and an access token.

In a step S3004, the cloud print service 321 performs user authentication processing based on the user information received from the client terminal 101 in the step S3003. When the user authentication processing is completed, the cloud print service 321 notifies the client terminal 101 of a result of the authentication processing.

If the user authentication is successful, in a step S3005, the OS 313 of the client terminal 101 acquires the access token from the cloud print service 321, and the process proceeds to the step S3008. On the other hand, if the user authentication fails, in a step S3006, the cloud print service 321 notifies the OS 313 of the client terminal 101 of the authentication error. After being notified of the authentication error, in a step S3007, the OS 313 of the client terminal 101 aborts the authentication processing based on the information of the authentication error received in the step S3006, followed by terminating the present process.

In the step S3008, the OS 313 of the client terminal 101 searches for printers registered with the cloud print service 321 and printers connected to the network 107. In doing this, the OS 313 transmits a printer information acquisition request having the access token attached thereto to the cloud print service 321.

The access token attached to the acquisition request transmitted in the step S3008 is used to identify the information of the printer that the user is permitted to use. In a step S3009, the cloud print service 321 transmits this printer information to the client terminal 101. The printer information includes the printer name assigned to the printer registered with the cloud print service 321 and the HW ID of the printer.

Further, the OS 313 of the client terminal 101 acquires a printer list transmitted from the cloud print service 321 and the identification information of the printers in the printer list. Note that in parallel with the processing in the steps S3008 and S3009, the OS 313 of the client terminal 101 searches for printers connected to the same network 107 as the client terminal 101. This search is device search using e.g. mDNS or Bonjour. Then, the OS 313 displays the printer list on the display section 216, based on the printer information acquired from the cloud print service 321 and the printer information detected by the search on the network 107. As shown in FIG. 4, this printer list is displayed in the area 402. Among the printers displayed in the area 402, "Cloud Printer 001", "Cloud Printer 002", and "Cloud Printer 003" are the printer information acquired from the cloud print service 321. Further, "Printer XX" is the printer information detected by the search on the network 107. The printer information items of "Cloud Printer 001", "Cloud Printer 002", and "Cloud Printer 003" are each displayed with an icon 403. The printer information "Printer XX" is displayed with an icon 404 different from the icon 403. With this, the user can grasp whether each printer in the printer list is a printer acquired from the cloud print service 321 or a printer detected by the search on the network 107. Note that the printer list may display printers acquired from the cloud print service 321 and omit printers detected by the search on the network 107. Then, the user can select printer information corresponding to the printer desired to be registered with the client terminal 101 from the printer list.

After this selection, in a step S3010, the OS 313 of the client terminal 101 inquires the capability information of the selected printer from the cloud print service 321. Which items of the capability information are to be inquired are already determined based on the specifications of the OS 313, i.e. are already set to the OS 313 in advance. More specifically, the OS 313 (acquisition unit) determines whether or not to acquire the capability information according to a type of each item name 501. For example, if the item names 501 are setting items defined as standard specifications by the IPP (such as "sheet size", "sheet type", and "color mode"), the OS 313 acquires the capability information including these item names 501.

In a step S3011, the cloud print service 321 transmits the capability information of the cloud print-compatible printer 104 to the OS 313 of the client terminal 101 as a response. With this, the OS 313 can acquire the capability information (acquisition of the capability information). Although the OS 313 acquires the capability information from the cloud print service 321 (cloud print server 102) in the present embodiment, this is not limitative, but the OS 313 may acquire the capability information directly from the cloud print-compatible printer 104. Further, in the present embodiment, although the information registered with the cloud print service 321 in the step S3001 is transmitted to the client terminal 101 in the step S3011, this is not limitative. For example, the information registered with the cloud print service 321 may be transmitted to the client terminal 101 at a timing other than this transmission timing. In this case, for example, the information registered with the cloud print service 321 can be transmitted to the client terminal 101 when the capability information of the cloud print-compatible printer 104 is changed. Further, the user may instruct the update of the capability information on a user interface (such as a screen on the display section 246) provided by the cloud print service 321, and the updated capability information may be transmitted to the client terminal 101 according to this instruction. Further, when the step S3010 is executed, the cloud print service 321 may acquire the capability information from the cloud print-compatible printer 104 and transmit the acquired capability information to the client terminal 101.

Further, in the step S3011, the cloud print service 321 transmits the attribute values 502 belonging to each of the item names 501 designated from the client terminal 101 and the default values thereof as a response. The attribute values 502 transmitted as the response in this step are all of the attribute values registered with the cloud print service 321 regardless of whether or not they are the attribute values defined by the IPP. The default values are values of the attribute values, which are to be used as the initial values. Note that if the cloud print service 321 does not store attribute values 502 corresponding to the inquiry from the OS 313, no attribute values 502 are transmitted as a response.

Next, the OS 313 starts installation of the cloud printer driver 311 based on the identification information and the printer name of the printer selected by the user. In a step S3012, the OS 313 creates a print queue of the cloud printer driver 311 having basic device capability information packed with the OS 313. The "device capability information" is definition information necessary for generating print setting capability information. The device capability information is e.g. information written in Extensible Markup Language (XML), such as Print Device Capabilities. FIG. 6A is a diagram showing an example of the device capability information in the initial state, packed with the OS. For example, a character string "Feature" 601 in FIG. 6A indicates that "PageMediaSize" representing the sheet size is a setting item (item name 501). A character string "Option" 602 indicates that "ISOA4" representing A4 is an option (attribute value 502) associated with "PageMediaSize". In the example shown in FIG. 6A, as the sheet size, the two options of "A4" and "LETTER" represented by "NorthAmericanLetter" are indicated. Out of these, "LETTER" is set to a default value as indicated by 'default="true"' 603. This information is stored in association with the print queue when the print queue is created, and is managed by the OS 313. Note that the device capability information in the initial state is unique device capability information regardless of the printer information on the network 107.

After that, the OS 313 updates the device capability information of the cloud printer driver 311 using the capability information acquired from the cloud print service 321. FIGS. 6B1 and 6B2 are diagrams each showing an example of the device capability information updated by using the capability information acquired from the cloud print service. For example, for "PageMediaSize" representing the sheet size in FIGS. 6B1 and 6B2, options other than "A4" and "LETTER" are added as the sheet size which can be printed by the cloud print-compatible printer 104. Thus, first, the client terminal 101 registers the device capability information of the cloud printer driver 311 in the print queue by associating the same with the device capability information packed with the OS 313. After that, the device capability information associated with the print queue is updated with the capability information acquired from the cloud print service 321. At this time, the OS 313 updates the device capability information using only the attribute values 502 defined by the IPP out of the capability information acquired from the cloud print service 321. With this update, for example, in a case where the item name 501 is double-sided printing, as the attribute values 502 belonging to double-sided printing, "single-sided/double-sided (short side-binding)/double-sided (long side-binding)" are stored in the device capability information. On the other hand, in acquisition of the capability information, even when attribute values 502 specific to the vendor as the sheet type are acquired, these attribute values 502 are not added to the device capability information. This makes it possible to set print settings that cannot be set by the device capability information packed with the OS 313. Thus, installation of the cloud printer driver 311 is completed. With this, it is possible to transmit print data from the client terminal 101 to the print queue for the cloud print-compatible printer 104, which has been created in the cloud print service 321.

Next, the OS 313 starts a process for installing the print settings extension application 312 which is associated with the printer and extends the functions of the cloud printer driver 311. In this installation process, the OS 313 first performs processing for adding identification additional information to the device identification information. The processing for adding identification additional information is processing required for acquiring the extension setup information file 700 (see FIG. 7) from the online support server 105, and a character string different from the normal device identification information is added. In the present embodiment, to distinguish the application from applications of other devices, the OS 313 adds the identification additional information of "PrinterApp_" indicating that the application is associated with a printer to the device identification information. Note that "PrinterApp_" is an example and may be any other character string, number, or symbol different from this character string. As a result of the processing for adding identification additional information, in a case where the device identification information of the cloud print-compatible printer 104 is device001, for example, the device identification information after the processing for adding identification additional information becomes "PrinterApp _device001" 703.

As shown in FIG. 3, in a step S3013, the OS 313 transmits the device identification information having added thereto the additional information indicating a retrieval target, to the online support service 351. Further, the OS 313 also requests the online support service 351 to search for the extension setup information file 700 including the device identification information having added thereto the additional information. In the request transmitted in the step S3013, "PrinterApp_device001" formed by adding the identification additional information is notified to the online support service 351.

In the online support service 351, the extension setup information file 700 (see FIG. 7) is stored. FIG. 7 is a diagram showing an example of the extension setup information file. The extension setup information file 700 is a file generated by the vendor of the cloud print-compatible printer 104 and registered with the online support service 351. In the extension setup information file 700, an application identifier for identifying the print settings extension application 312 used for setting print data to be transmitted to the cloud print-compatible printer 104 is described. In the extension setup information file 700 shown in FIG. 7, "PackageFamilyName" 701 is the identification information of the print settings extension application 312. On the other hand, in "PrinterHardwareID" 702, the character string of "PrinterApp_device001" 703 formed by adding the identification additional information ("PrinterApp_") to the identification information ("device001") of the cloud print-compatible printer 104 is described. Note that the online support service 351 stores, in addition to the extension setup information file 700 in which the identification information of the print settings extension application 312 is described, extension setup information in which the identification information of the printer driver is described. In the extension setup information file in which the identifier of the printer driver is described, the identifier of the printer driver is described in place of "PackageFamilyName" 701. Further, in this extension setup information file, device identification information in which additional identification information is not written is described in "PrinterHardwareID". As described above, in the online support service 351, the extension setup information file in which the identifier of the printer driver is described and the extension setup information file in which the identifier of the print settings application (the print settings extension application 312) is described is stored. Therefore, the OS 313 performs addition of the identification additional information to the device identification information in order to acquire the necessary extension setup information file as required.

After receiving the search request in the step S3013, the online support service 351 identifies an extension setup information file. This extension setup information file is an extension setup information file of which "PrinterHardwareID" matches the device identification information having the identification additional information added thereto, which is specified in the request.

As shown in FIG. 3, in a step S3014, if the extension setup information file 700 including the device identification information indicating a retrieval target is stored, the online support service 351 transmits this extension setup information file 700 to the OS 313 as a response. At this time, the contents of the extension setup information file 700 are written into the registry of the OS 313.

In a step S3015, the OS 313 installs the extension setup information written in the extension setup information file 700 acquired from the online support service 351 in association with the print queue created in the step S3012. In a step S3016, the OS 313 extracts an application ID from the extension setup information installed in the step S3015. The "application ID" is an identifier defined by "PackageFamilyName" in the extension setup information file 700. The process up to this step is the process performed in the case where the extension setup information file 700 associated with the cloud print-compatible printer 104 is stored in the online support service 351.

On the other hand, there is a case where the extension setup information file 700 including the device identification information indicating a retrieval target is not detected. In this case, in a step S3017, the OS 313 completes the installation of the cloud printer driver 311 and aborts the application installation process. The processing in the step S3017 is executed, for example, in a case where the extension setup information file 700 cannot be received within a predetermined time period after the search request is transmitted in the step S3013 or in a case where an error notification is received from the online support service 351.

The processing operations in a step S3018 et seq. are executed in a case where the OS 313 of the client terminal 101 has succeeded in acquisition of the extension setup information file 700 and extraction of the application ID in the step S3016. In the step S3018, the OS 313 requests the application management service 331 to transmit an application whose application ID matches the extracted application ID. The application management service 331 stores applications which operate on the client terminal 101 and application IDs which are respective identifiers of the applications, in a state associated with each other. The vendor which provides the cloud print-compatible printer 104 registers applications and respective application IDs therefor with the application management service 331.

If the application management service 331 holds the print settings extension application 312 having an application ID that matches the application ID requested in the step S3018, the process proceeds to a step S3019. In the step S3019, the application management service 331 transmits the print settings extension application 312 to the client terminal 101 as a response. The print settings extension application 312 transmitted in the step S3019 as the response is the application to which the same ID as the requested application ID is added. In a step S3020, the OS 313 of the client terminal 101 installs the print settings extension application 312 transmitted in the step S3019 in a state associated with the print queue on the client side. After completion of this installation, the OS 313 stores the application ID in the registry as print queue information. Further, the print settings extension application 312 is configured such that the print settings extension application 312 performs notification of an event to the OS 313 at a timing when the print queue associated with this application is set on the print settings screen. The print settings extension application 312 installed in the step S3020 is started after the client terminal 101 is powered on and the OS 313 is started. After that, the print settings extension application 312 operates as a background task.

On the other hand, if the application management service 331 does not hold the print settings extension application 312 having an application ID that matches the application ID requested in the step S3018, the process proceeds to a step S3021. In the step S3021, the OS 313 aborts the application installation process. In this case, the cloud printer driver 311 is installed in a state associated with the created print queue. Then, the print settings extension application 312 is terminated without being associated with the print queue.

Note that although in the above-described process, a predetermined character string is added to the device identification information of the cloud print-compatible printer 104, and the search for the extension setup file is performed, this is not limitative. For example, in a case where the file for installing the printer driver can be identified, the search may be performed without adding the predetermined character string.

Figure 8:
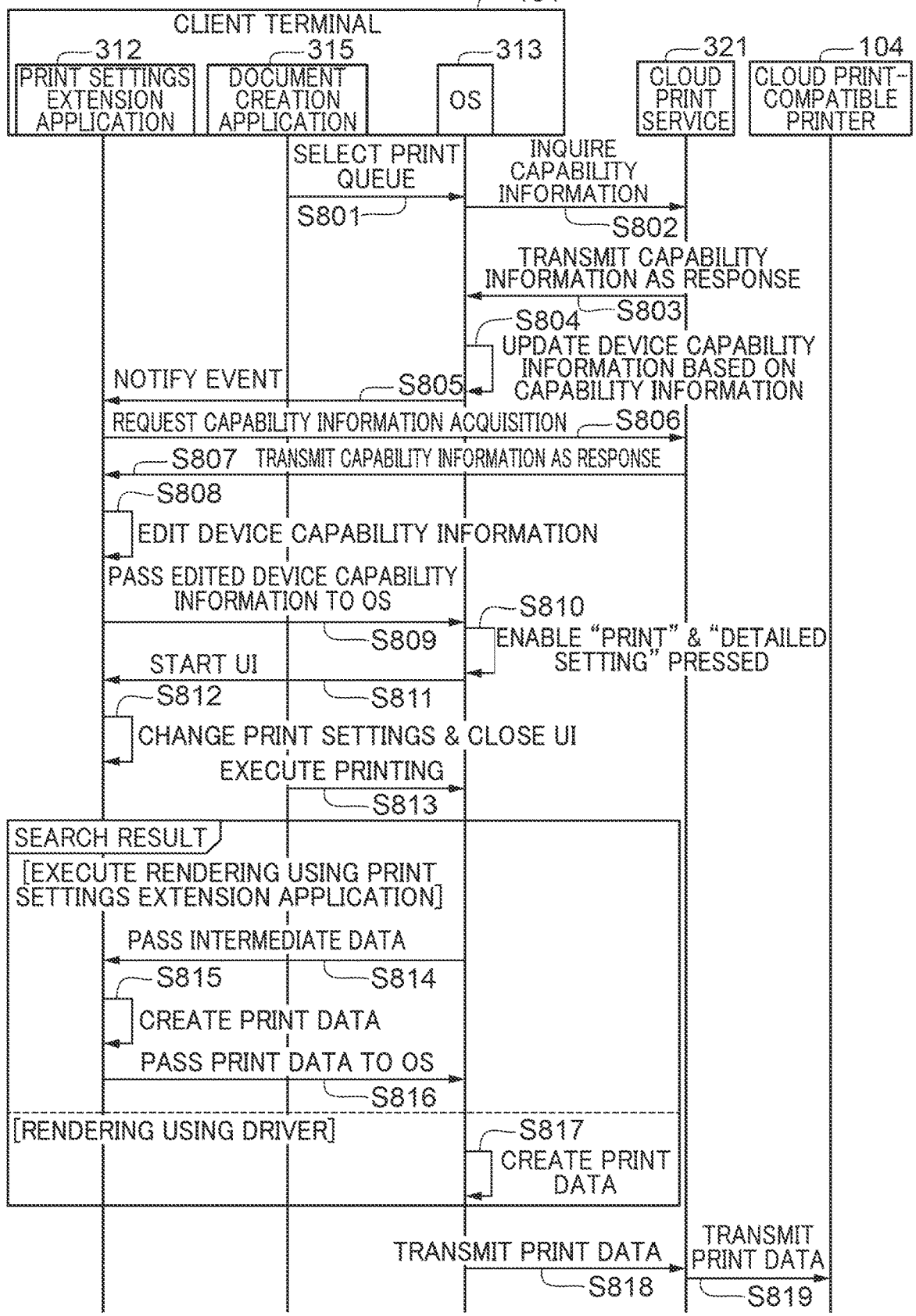
FIG. 8 is a sequence diagram showing a process from a step for performing print setting using the print settings extension application to a step for transmitting print data.

Next, a processing sequence executed between the print settings extension application 312, the document creation application 315, and the OS 313 of the client terminal 101, the cloud print service 321, and the cloud print-compatible printer 104 will be described with reference to FIG. 8. FIG. 8 is a sequence showing a process from a step for performing print setting using the print settings extension application to a step for transmitting print data.

The document creation application 315 is an application, such as an application for creating document data, an application for creating a presentation material, and an application for displaying a photograph and image data. The document creation application 315 is installed in the client terminal 101 in advance. The document creation application 315 displays a print settings initial screen 1100 (see FIG. 11) as a print settings screen for selecting a print queue, on the display section 216. The print settings initial screen 1100 includes an object 1101 for selecting a print queue, a plurality of objects 1102 for setting a variety of print settings, and a print preview image 1103. Further, the print settings initial screen 1100 includes an object 1104 for setting other settings and an object 1105 for inputting a print instruction. FIG. 11 is a diagram showing an example of the print settings screen displayed by the document creation application. Referring to FIG. 11, one of the objects 1102 is "double-sided printing" in which "single-sided", "double-sided (short-side binding)" and "double-sided (long-side binding)" are included. As described above, "double-sided printing" is an item name 501 (first information), and "single-sided", "double-sided (short-side binding)", and "double-sided (long-side binding)" are attribute values 502 (second information) (see FIG. 5). Therefore, in each object 1102, an item name 501 (first information) and attribute values 502 (second information) are collectively displayed. Hereinafter, this collective display is referred to as the "first display". In the object 1102 of "double-sided printing", one of the attribute values can be selected from "single-sided", "double-sided (short-side binding)", and "double-sided (long-side binding)". Although in the present embodiment, the print settings initial screen 1100 is displayed by the document creation application 315, this is not limitative, but for example, the print settings initial screen 1100 may be displayed by the OS 313.

As shown in FIG. 8, in a step S801, the OS 313 selects a print queue. This print queue is associated with a printer set as the default printer. In the present embodiment, it is assumed that the cloud print-compatible printer 104 has been selected as the default printer. Note that the processing operations in the step S801 et seq. are also executed in a case where the user changes the printer by operating the object 1101 on the print settings initial screen 1100.

In a step S802, the OS 313 inquires the capability information of the cloud print-compatible printer 104 from the queue on the cloud, associated with the cloud print-compatible printer 104, of the cloud print service 321. As described above, which item of the capability information is to be inquired is determined based on the specifications of the OS 313 in advance. Therefore, the capability information acquired at this timing is the same as that acquired in the step S3001 of the sequence shown in FIG. 3. The inquiry is made to the cloud print-compatible printer 104 using a command of a standard protocol defined by the IPP, such as Get-print-Attributes. In a case where Get-print-Attributes is used, the capability information determined by the OS 313 is inquired in a list form.

In a step S803, the cloud print service 321 transmits the capability information of the cloud print-compatible printer 104 to the OS 313 as a response. This capability information is obtained from the list of the capability information transmitted in response to Get-print-Attributes, including double-sided printing. For example, let it be assumed that the item name 501 of "sheet size (media size)" is designated in Get-print-Attributes (IPP). In a case where the cloud print service 321 holds the attribute values 502 of the sheet size, the cloud print service 321 transmits e.g. "A4", "B5", and "Letter" which are attribute values 502 as a response. In the present embodiment, the cloud print service 321 transmits "double-sided printing", and "single-sided", "double-sided (short-side binding)", and "double-sided (long-side binding)" belonging to "double-sided printing" to the OS 313 as capability information. In a case where no attribute value 502 designated in Get-print-Attributes is present in the queue of the cloud print service 321, which is associated with the cloud print-compatible printer 104, the cloud print service 321 does not transmit the associated attribute value 502 as a response. The capability information acquired in the step S803 is only the capability information that can be inquired regardless of the type or capability of the printer to which the OS 313 is connected.

In a step S804, the OS 313 updates the device capability information with the capability information acquired from the cloud print service 321 in the step S803. More specifically, in a case where there is an update in the device capability information acquired in the step S803 when compared with the device capability information generated in the step S3012 of the sequence shown in FIG. 3, by executing the step S804, the OS 313 can update the device capability information managed by the client terminal 101. Note that the update of the device capability information in the step S804 is performed only with respect to the attribute values 502 defined by the industry standard specifications. Further, in the step S804, the capability information of double-sided printing is also written in the device capability information.

In a step S805, the OS 313 performs notification of an event and transmission of an API (Application Programming Interface) used for editing the device capability information to the print settings extension application 312. At this timing, the print settings extension application 312 is registered with the OS 313 of the client terminal 101.

Upon receipt of the above-mentioned notification, in a step S806, the print settings extension application 312 requests the cloud print service 321 to acquire capability information. This capability information is for writing item names 501 and attribute values 502 uniquely defined by the printer vendor into the device capability information. Therefore, in the step S806, in a case where the notification is received from the OS 313, the print settings extension application 312 inquires the capability information of the cloud print-compatible printer 104 from the cloud print service 321. More specifically, the print settings extension application 312 inquires the capability information including the item names 501 specific to the printer vendor and the attribute values 502 specific to the printer vendor from the cloud print service 321. Similar to the step S802, this inquiry is performed by using Get-print-Attributes. Note that in the present embodiment, in the step S806, it is assumed that the capability information including the item names 501 specifically defined by the printer vendor and the attribute values 502 specifically defined by the printer vendor is requested. Note that in acquisition of the capability information by the OS 313, the capability information may be requested also with respect to the item names 501 already acquired.

In a step S807, in a case where the inquiry about the capability information is received from the print settings extension application 312 in the step S806, the cloud print service 321 transmits the capability information as a response. The response method used here is the same as in the step S3011 of the sequence shown in FIG. 3. In the present embodiment, in the step S807, the cloud print service 321 transmits the capability information of the cloud print-compatible printer 104, stored in the cloud print service 321, as a response. Note that in the step S807, the cloud print service 321 may reacquire the capability information from the cloud print-compatible printer 104 after receiving the request in the step S806 and transmit the reacquired capability information to the client terminal 101 as a response.

In a step S808, after acquiring the capability information of the cloud print-compatible printer 104 from the cloud print service 321 (acquisition step), the print settings extension application 312 edits the device capability information managed by the OS 313 using a configuration information object. The "configuration information object" is a group of data items necessary for editing the device capability information. In the present embodiment, the print settings extension application 312 cannot directly edit the device capability information held by the OS 313. Therefore, the configuration information object is used to change the device capability information held by the OS 313. More specifically, in the step S808, the device capability information is edited by converting the capability information acquired in the step S807, which includes e.g. "binding without staple" and "saving of job in printer", to the device capability information, and adding the converted device capability information to the configuration information object. By executing the process up to the step S808, in addition to the standard capability information acquired by the inquiry performed by the OS 313, item names 501 and attribute values 502 which are specific to the printer vendor are stored in the device capability information.

Next, in a step S809, the print settings extension application 312 passes the device capability information edited in the step S808 to the OS 313. Then, the OS 313 stores the device capability information acquired from the print settings extension application 312 in a state associated with the print queue.

In a step S810, in a case where the OS 313 has updated the device capability information, an object that serves as a trigger for displaying the user interface (UI) of the print settings extension application 312 is enabled. Hereinafter, this UI of the print settings extension application 312 is referred to as "the second display (see FIGS. 10A to 10I)". The second display will be described hereinafter. Further, the object which serves as the trigger for displaying the second display is the object 1104 on the print settings initial screen 1100 shown in FIG. 11 in the present embodiment. The object 1104 functions as operating means for performing an operation for changing the display state of the display section 216 from a state displaying the first display (see FIG. 11) to a state displaying the second display. Some users do not mind that the display state of the display section 216 is not changed from the first display when printing is performed, while some users regard that the second display is better (preferable). With the object 1104, the display state of the display section 216 can be selected according to user's preference. Note that the object 1104 is grayed out until the processing in the step S810 is completed, so that it is impossible for a user to operate the object 1104 to display the UI (print settings screen 100) of the print settings extension application 312, i.e., the second display. In a case where the processing in the step S810 is completed, the object 1104 is released from its grayed-out state, which enables the user to operate the object 1104.

When the user operates the object 1104, in a step S811, the print settings extension application 312 displays the print settings screen 100 shown in FIGS. 10A to 10I, as the second display. The print settings screen 100 is displayed in a case where the print settings extension application is installed. The print settings screen 100 is displayed regardless of the type of the document creation application 315.

Here, the screen display in a case where the print settings extension application 312 is not installed will be described. FIGS. 9A to 9D are diagrams each showing an example of the print settings screen displayed in the case where the print settings extension application 312 is not installed. In the case where the print settings extension application 312 is not installed, that is, in a case where the print settings extension application 312 is not associated with the print queue selected above, a standard print settings screen 900A shown in FIG. 9A is displayed. The standard print settings screen 900A is installed in the OS 313 in advance. On the standard print settings screen 900A, double-sided printing is displayed as a setting item, and "single-sided", "double-sided (short-side binding), and "double-sided (long-side binding)" belonging to this item of double-sided printing are selectably displayed. This display state is the same as the display state of the object 1102 on the print settings initial screen 1100 (first display) shown in FIG. 11.

By operating a detailed setting button 901, the standard print settings screen 900A is switched to a detailed print settings screen 900B shown in FIG. 9B. The detailed print settings screen 900B is for setting the setting items that cannot be displayed in FIG. 9A. The detailed print settings screen 900B is scrolled by operating a scroll bar 906. With this, as shown in FIGS. 9C and 9D, a plurality of setting items supported by the OS 313 are displayed, and the print settings can also be set with respect to these setting items. By operating an OK button 902 on the detailed print settings screen 900B, the print settings set on the detailed print settings screen 900B are saved and the display can be returned to the standard print settings screen 900A shown in FIG. 9A. An application button 903 on the standard print settings screen 900A is a button for saving the print settings, and a cancel button 904 is a button for switching the screen to the print settings initial screen 1100 (see FIG. 11) without saving the print settings. Further, by operating an OK button 905 on the standard print settings screen 900A, the print settings are saved and the display is switched to the print settings initial screen 1100. Note that on the standard print settings screen 900A and the detailed print settings screen 900B, the item names 501 and the attribute values 502, which are specifically defined by the printer vendor, cannot be set. Further, the items of the print setting capability information generated by the OS 313 are displayed as they are, and hence the display on the print settings screen sometimes becomes one unintended by the vendor. For example, in the conventional printer driver of the printer vendor, for double-sided printing, settings information of "double-sided: ON/OFF" and settings information of "binding side: short side/long side" are displayed at respective separate locations. This display is a display which is often seen by general (many) users, i.e. a familiar display. In contrast, in the OS standard driver, for double-sided printing, "single-sided", "double-sided (short-side binding), and "double-sided (long-side binding)" are collectively displayed in a single combo box, in other words, displayed in the first display. This type of display is not often seen by general users, and some users may be confused about the operation when printing is performed, so that the operability can be lowered.

In view of this, the client terminal 101 is configured to prevent such lowering of the operability as will occur when printing is performed. This configuration and operation thereof will be described below. Here, the description returns again to the screen display in the case where the print settings extension application 312 is installed. The print settings extension application 312 receives the print settings information based on the print setting capability information generated by the OS 313 from the device capability information and displays the print settings screen (extended print settings screen) 100 shown in FIGS. 10A to 10I on the display section 216. The print settings screen 100 is scrolled by operating a scroll bar 1003. With this, as shown in FIGS. 10A to 10E, the display contents on the print settings screen 100 are changed, whereby each setting item of print settings can be set to a setting.

For example, the output sheet size as a setting item 1001 on the print settings screen 100 shown in FIG. 10A is print settings information generated from "psk: PageMediaSize" in FIG. 6B1. Further, "A4" as an option of the output sheet size is generated by the print settings extension application 312 based on the print settings information "psk: ISOA4" for display. Thus, the print settings extension application 312 displays the print settings screen 100 by converting the device capability information to settings. Further, since the print settings screen 100 is generated from the device capability information including the printer vendor-specific capability information, it is possible to set the setting items and the settings that cannot be set on the standard print settings screen 900A and the detailed print screen 900B, provided by the OS 313. Further, the user can select an OK button 1002 on the print settings screen 100. The OK button 1002 is an object for finalizing the print settings. The print settings extension application 312 provides a function for enabling a user to change print settings as desired, and when a print setting is changed, stores a setting of the changed print setting. For example, let it be assumed that the user has changed the sheet size from "A4" to "Letter". In this case, corresponding print settings information held by the print settings extension application 312 is also changed from "A4" to "Letter". When the OK button 1002 is selected, the print settings extension application 312 passes the print settings information processed in the print settings screen 100 to the OS 313.

As shown in FIG. 8, in a step S812, in a case where the print settings information is passed to the OS 313, the print settings extension application 312 terminates the display of the print settings screen 100. Then, after execution of the step S812, the print settings initial screen 1100 shown in FIG. 11 is displayed. The print settings initial screen 1100 displayed at this time includes the settings set by the print settings extension application 312.

When the user selects the object 1105 on the print settings initial screen 1100, a print instruction is input to the OS 313. In a step S813, the OS 313 executes the process related to printing based on the instruction input via the document creation application 315.

In a step S814, upon receipt of the input of the print instruction in the step S813, the OS 313 generates intermediate data and passes the generated intermediate data and the print settings information edited on the print settings screen to the print settings extension application 312. The "intermediate data" is data generated before conversion to print data, such as PDL (Page Description Language) data, and refers to e.g. XPS data. The print settings information is also included in the intermediate data.

In a step S815, upon receipt of the intermediate data and the print settings information, passed in the step S814, the print settings extension application 312 creates print data based on the intermediate data, and generates print capability information based on the print settings information. The "print data" refers to PDL data, such as a PDF file. The "print capability information" refers e.g. to information that describes the print settings information using attribute values defined by the IPP.

In a step S816, the print settings extension application 312 passes the print data and the print capability information, generated in the step S815, to the print queue of the OS 313.

In a step S817, the OS 313 generates XPS data, edits the page layout, and converts the XPS data to a predetermined format to generate print data and print capability information.

In a step S818, the OS 313 transmits the print data and the print capability information, passed from the print settings extension application 312, or the print data and the print capability information, generated by the OS 313, to the cloud print service 321 via the print queue.

In a step S819, the cloud print service 321 transmits the print data and the print capability information, passed from the client terminal 101 in the step S818, to the cloud print-compatible printer 104. Although in the present embodiment, in a case where the cloud print service 321 receives the print data and the print capability information, the received print data and print capability information are transmitted to the cloud print-compatible printer 104, this is not limitative. For example, the cloud print-compatible printer 104 may periodically transmits an inquiry to the cloud print service 321 to acquire print data which has not been printed and the print capability information associated with this print data.

Next, the print settings UI (second display) displayed by the print settings extension application 312 will be described. Here, the display of settings of double-sided printing will be described by way of example. Information on double-sided printing is acquired from the device capability information, and the print setting capability information generated by the OS 313 is described as "psk: JobDuplexAllDocumentsContiguously". Further, values generated as options (attribute values 502) for this print setting (item name 501) are described as "psk: OneSided, psk: TwoSidedShortEdge, psk: TwoSidedLongEdge". In a case where these values are directly displayed on the print settings UI, as mentioned above, for double-sided printing, "single-sided", "double-sided (short-side binding), and "double-sided (long-side binding)" are collectively displayed in a single combo box. On the other hand, in the conventional printer driver of the printer vendor, for double-sided printing, a set of selection items of "double-sided: ON/OFF" and a set of selection items of "binding side: short side/long side" are displayed at respective separate combo boxes. Therefore, the display state is different between the case where the print setting capability information generated by the OS 313 is directly displayed on the print settings UI and the case where the print setting capability information is displayed by the conventional printer driver. As a result, there is a possibility that the appearance and feeling of use causes a feeling of wrongness and the operability is lowered.

Figure 12:
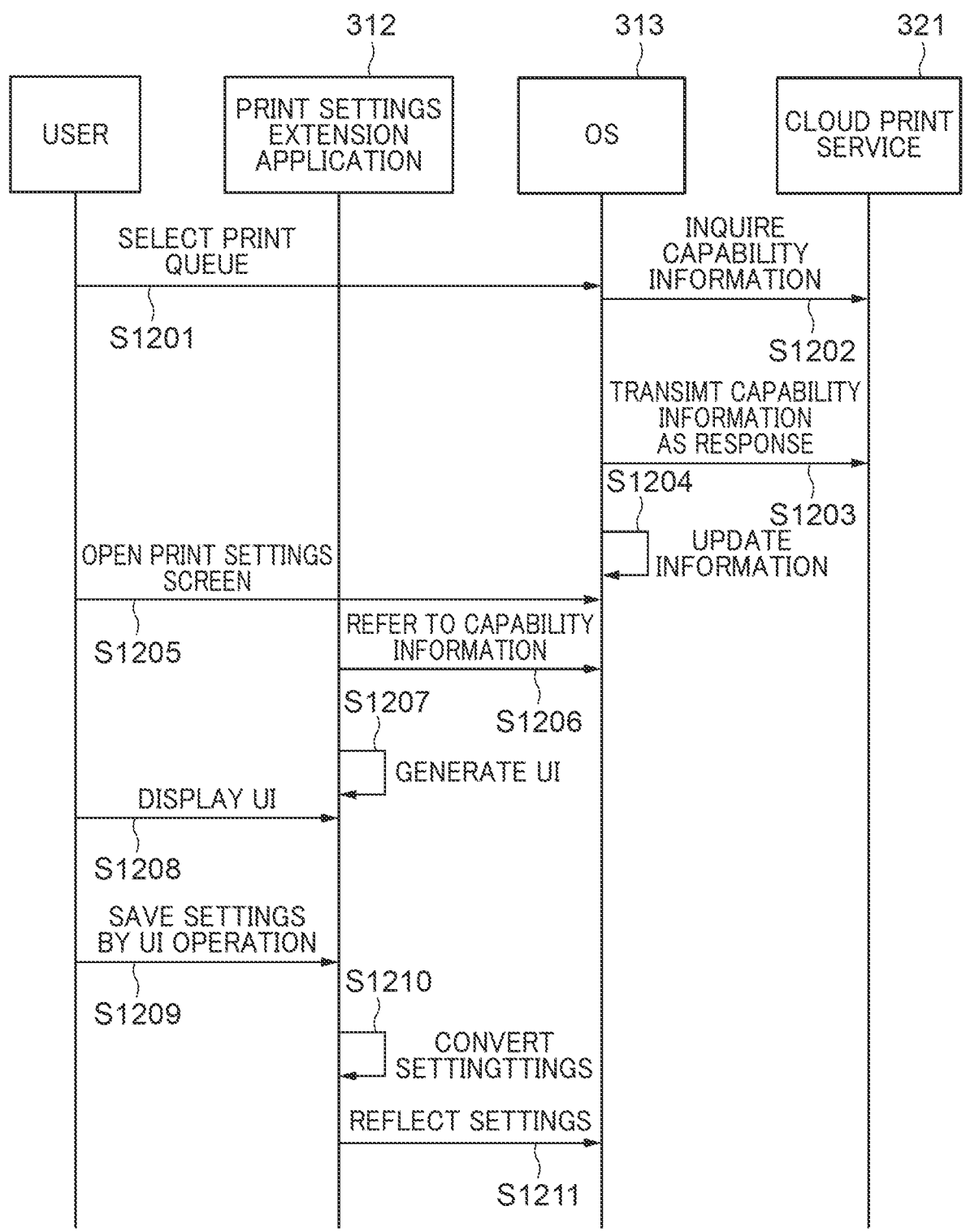
FIG. 12 is a sequence diagram of a process in which the print settings extension application divides and adds a setting item of print settings for display.

A sequence of a process executed between the user, the print settings extension application 312, the OS 313 of the client terminal 101, and the cloud print service 321 will be described with reference to FIG. 12. FIG. 12 is a sequence diagram showing a process in which the print settings extension application divides and adds the print setting items for display. In the sequence shown in FIG. 12, the process is started when the user selects a print queue with respect to the object 1101 on the print settings initial screen 1100 shown in FIG. 11. In a step S1201, the user selects a print queue to perform printing.

In a step S1202, by using the selection in the step S1201 as a trigger, the OS 313 inquires the capability information associated with the selected print queue from the cloud print service 321.

In a step S1203, the cloud print service 321 transmits the capability information corresponding to the inquiry received in the step S1202 to the OS 313 as a response.

In a step S1204, the OS 313 updates the device capability information using the capability information acquired in the step S1203. Note that the steps S1201 to S1204 are the same as the steps S801 to S804 in the sequence shown in FIG. 8.

In a step S1205, the user opens the print settings initial screen 1100.

In a step S1206, due to opening of the print settings initial screen 1100 in the step S1205, the print settings extension application 312 refers to the capability information held by the OS 313.

In a step S1207, the print settings extension application 312 generates the print settings screen 100 (UI) shown in FIGS. 10A to 10F.

In a step S1208, the print settings extension application 312 displays the print settings screen 100 generated in the step S1207 on the display section 216. With this, the user becomes capable of viewing the print settings screen 100.

Figure 13:
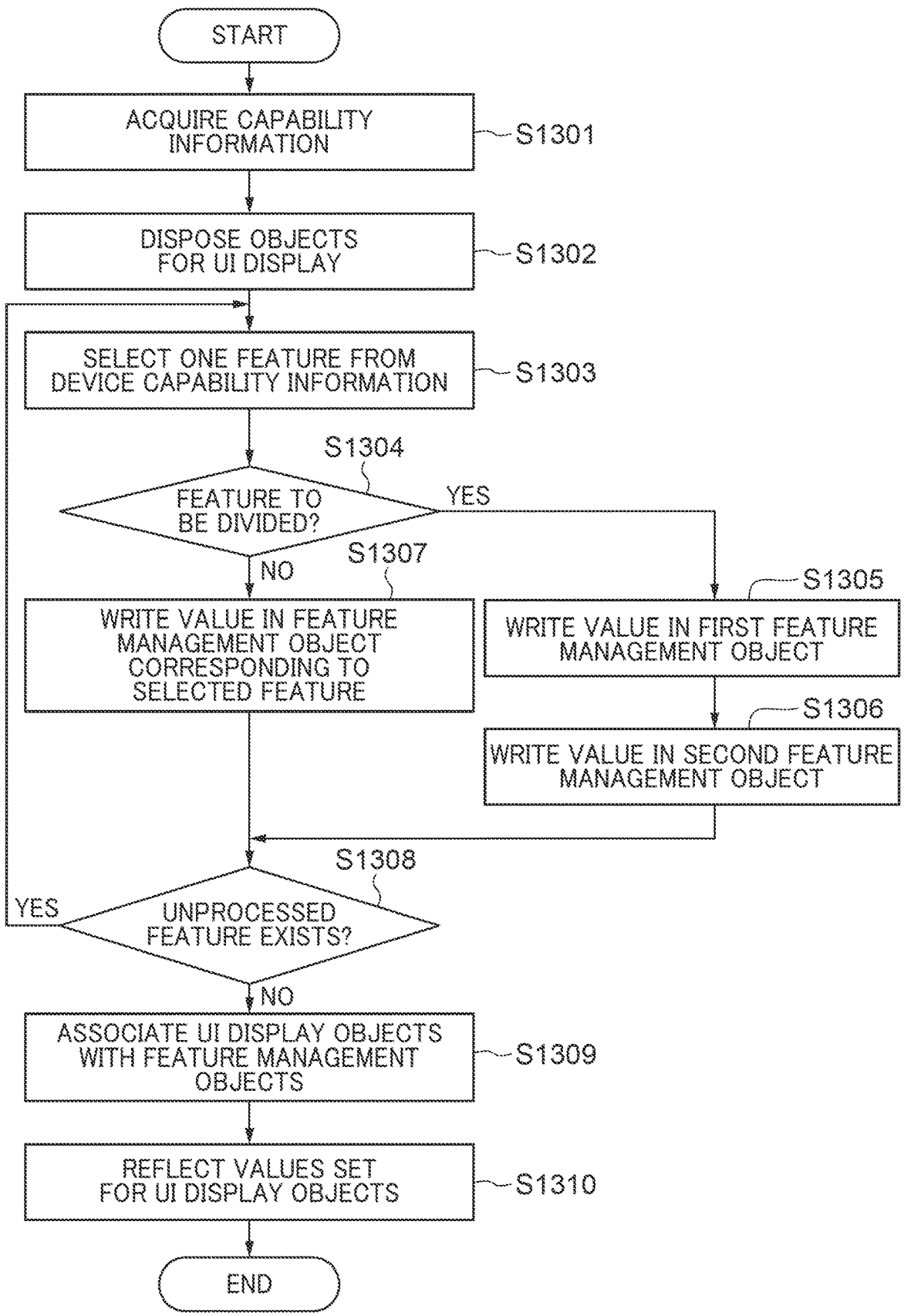
FIG. 13 is a flowchart of the process in which the print settings extension application divides and adds setting item of print settings.

Here, the processing in the step S1207 will be described in detail with reference to FIG. 13. FIG. 13 is a flowchart of a process performed by the print settings extension application, for dividing and adding the print setting items. As shown in FIG. 13, in a step S1301 corresponding to the step S1206, the print settings extension application 312 acquires (refer to) the capability information held by the OS 313. This capability information includes information of e.g. "psk: PageMediaSize" and "psk: PageOrientation" as Features, and "psk: ISOA4" and the like as their Options.

In a step S1302, the print settings extension application 312 disposes the UI display objects of the print setting items supported by the print settings extension application 312 on the print settings UI (print settings screen 100). Note that the UI display objects are objects that can be displayed regardless of the capability information of the printer.

In a step S1303, the print settings extension application 312 selects one of Features (capability information items) acquired in the step S1301.

In a step S1304, the print settings extension application 312 determines whether or not Feature (capability information item) selected in the step S1303 is Feature determined in advance as an object to be divided. If it is determined in the step S1304 that the selected Feature is Feature determined in advance as an object to be divided, the process proceeds to a step S1305. On the other hand, if it is determined in the step S1304 that the selected Feature is not Feature determined in advance as an object to be divided, the process proceeds to a step S1307. Note that in the present embodiment, "psk: JobDuplexAllDocumentsContiguously" is taken as an example of Feature to be divided. Therefore, if "psk: JobDuplexAllDocumentsContiguously" is detected in the step S1304, the process proceeds to the step S1305, whereas if not, the process proceeds to the step S1307.

In the step S1305, the print settings extension application 312 generates an object of "double-sided printing: ON/OFF" out of the two feature management objects of "double-sided printing: ON/OFF" and "binding side: long side/short side". When generating this, in a case where the Option of "psk: JobDuplexAllDocumentsContiguously" is "psk: TwoSidedShortEdge", the value of "double-sided: ON" is set (written). Similarly, in a case where the Option is "psk: TwoSidedLongEdge" as well, the value of "double-sided: ON" is set. In a case where the Option is "psk: OneSided", the value of "double-sided: OFF" is set.

In a step S1306, the print settings extension application 312 generates an object of "binding side: long side/short side". In the Option group, "long side" and "short side" are set (written). In a case where the Option of "psk: JobDuplexAllDocumentsContiguously" detected in the step S1304 is "psk: TwoSidedShortEdge", the Option is set to "short side". On the other hand, in a case where the Option is "psk: TwoSidedLongEdge", the Option is set to "long side". In this setting, "Visibility" is set to "Visible". In a case where the Option is "psk: OneSided", "Visibility" is set to "Collapsed". After execution of the step S1306, the process proceeds to a step S1308.

In the step S1307 after execution of the step S1304, the print settings extension application 312 refers to the capability information held by the OS 313. Then, the print settings extension application 312 sets the value of Visibility for switching whether to display or hide the currently held Option group and the selected Option, for a feature management object associated therewith. In the step S1307, the print settings extension application 312 sets "Visibility" of the feature management object associated with Feature being selected to "Visible". After execution of the step S1307, the process proceeds to the step S1308.

In the step S1308, the print settings extension application 312 determines whether or not there is an unprocessed Feature. If it is determined in the step S1308 that there is an unprocessed Feature, the process returns to the step S1303, and the subsequent steps are sequentially executed. On the other hand, if it is determined in the step S1308 that there is no unprocessed Feature, the process proceeds to a step S1309.

In the step S1309, the print settings extension application 312 associates the UI display objects and the feature management objects with each other. With this association, it is made possible to reflect the value of each feature management object on a UI display object associated therewith. Further, it is made possible to reflect a value of a UI display object changed by a UI operation, on a feature management object associated therewith.

In a step S1310, the print settings extension application 312 causes the values set for the UI display objects to be reflected on the UI (print settings screen 100). With this, the UI (print settings screen 100) is placed in a state in which the Option group, Visibility, and the values selected above, which are set for each UI display object, are reflected thereon. Note that Features for which UI display objects are disposed and which have not been selected in the step S1303 are hidden by setting "Visibility" to "Collapsed".

As shown in FIG. 12, in a step S1209, the user saves the settings by performing a predetermined UI operation.

In the step S1210, the print settings extension application 312 converts the settings saved in the step S1209.

In a step S1211, the print settings extension application 312 causes the settings converted in the step S1210 to be reflected on the objects held by the OS 313.

Figure 14:
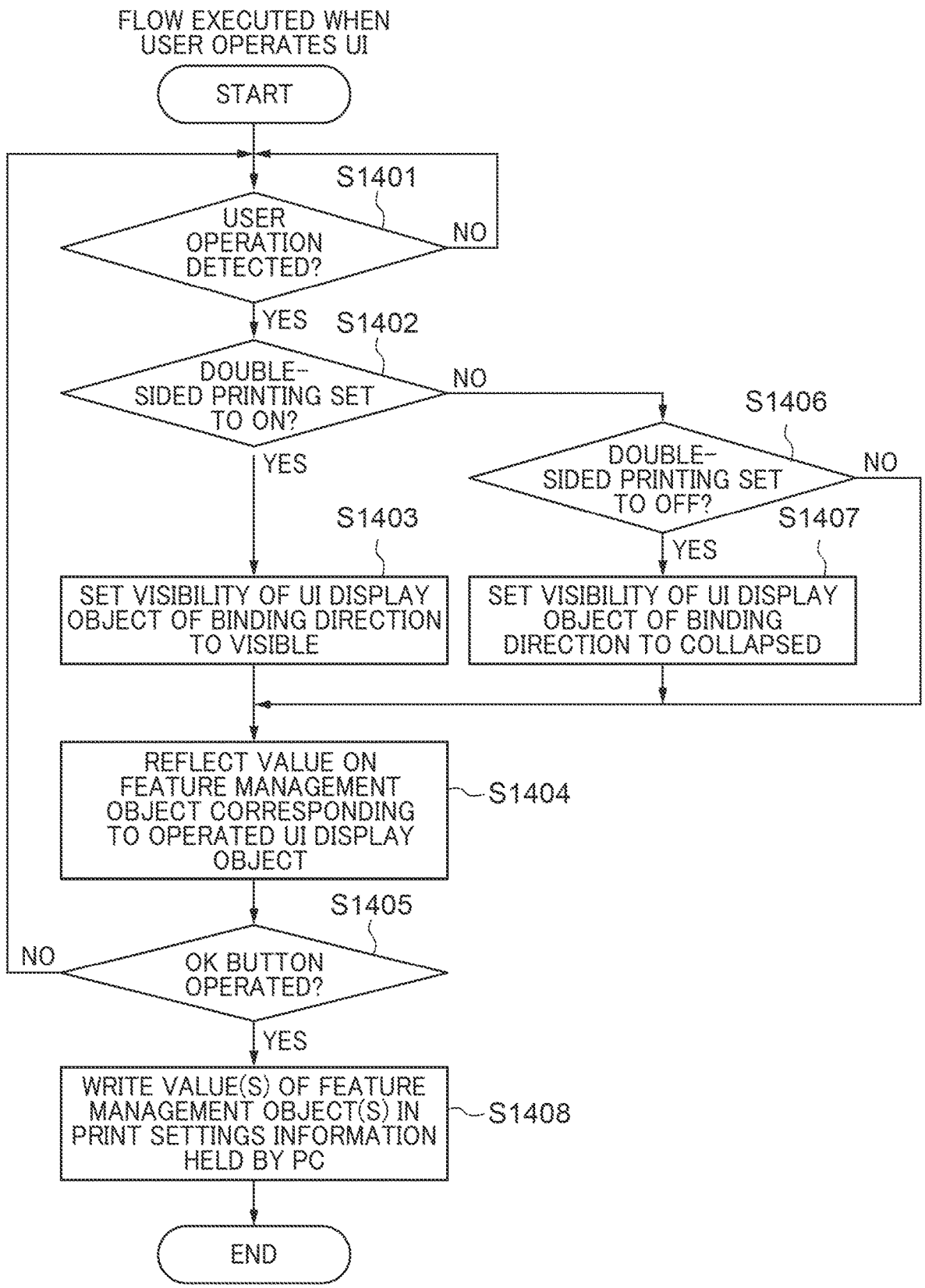
FIG. 14 is a flowchart of a process performed by the print settings extension application, for reflecting settings changed by a UI operation on objects held by the OS.

Here, the processing operations in the steps S1209 to S1211 will be described in detail with reference to FIG. 14. FIG. 14 is a flowchart of a process performed by the print settings extension application, for causing a setting changed by a UI operation to be reflected on an object held by the OS. As shown in FIG. 14, in a step S1401, the print settings extension application 312 determines whether or not a user operation (UI operation) has been detected. If it is determined in the step S1401 that a user operation has been detected, the process proceeds to a step S1402. On the other hand, if it is determined in the step S1401 that no user operation has been detected, the process repeats the step S1401. Note that the following description of steps S1402 to S1404 is given based on an example of reflection of settings related to double-sided printing, but it is assumed that similar processing operations are performed with respect to item names related to other objects.

In the step S1402, the print settings extension application 312 determines whether or not Option of "double-sided" on the UI (print settings screen 100) is set to "ON". If it is determined in the step S1402 that Option is set to "ON", the process proceeds to a step S1403. On the other hand, if it is determined in the step S1402 that Option is not set to "ON", the process proceeds to a step S1406.

In the step S1403, the print settings extension application 312 sets "Visibility" of the UI display object of the "binding direction" to "Visible", and the process proceeds to a step S1404.

In the step S1406 after execution of the step S1402, the print settings extension application 312 determines whether or not Option of "double-sided" on the UI is set to "OFF". If it is determined in the step S1406 that Option is set to "OFF", the process proceeds to a step S1407. On the other hand, if it is determined in the step S1406 that Option is not set to "OFF", the process proceeds to the step S1404.

In the step S1407, the print settings extension application 312 sets "Visibility" of the UI display object of the "binding direction" to "Collapsed". With this, visual recognition of the object of "binding direction" on the UI is disabled, and the setting of "binding direction" is restricted (inhibited).

In the step S1404, the print settings extension application 312 causes the value to be reflected on the feature management object corresponding to the UI display object operated in the above.

In a step S1405, the print settings extension application 312 determines whether or not the OK button 1002 is operated. If it is determined in the step S1405 that the OK button is operated, the process proceeds to a step S1408. On the other hand, if it is determined in the step S1405 that the OK button is not operated, the process returns to the step S1401, and the subsequent steps are sequentially executed.

In the step S1408, the print settings extension application 312 causes the value(s) of the feature management object(s) to be reflected on the print settings information held by the OS 313. As for "double-sided printing", the objects of "double-sided printing: ON/OFF" and "binding direction: long side, short side" are held. These objects are different from "psk: JobDuplexAllDocumentsContiguously" which is the item of double-sided printing in the capability information held by the OS 313, and hence conversion of the values is required. More specifically, for the case of "double-sided printing: OFF", Option of "psk: OneSided" is written into the capability information. Further, for the case of "double-sided printing: ON" and "binding direction: long side", Option of "psk: TwoSidedLongEdge" is written into the capability information. Further, for the case of "double-sided printing: ON" and "binding direction: short side", Option of "psk: TwoSidedShortEdge" is written into the capability information.

With the above-described process (performed by the print settings extension application 312), it is possible to display the print settings screen 100 (second display) shown in FIGS. 10A to 10F on the display section 216. As described above, the capability information has a hierarchical structure including item names 501 as the first information and a plurality of attribute values 502 associated with each item name as the second information belonging to the first information (see FIG. 5). For example, "double-sided printing" is one of the item names 501. Further, "single-sided printing (double-sided printing is disabled)", "short-side binding (short-side binding in double-sided printing)", and "long-side binding (long-side binding in double-sided printing)" are the attribute values 502 belonging to "double-sided printing".

Figure 10F:
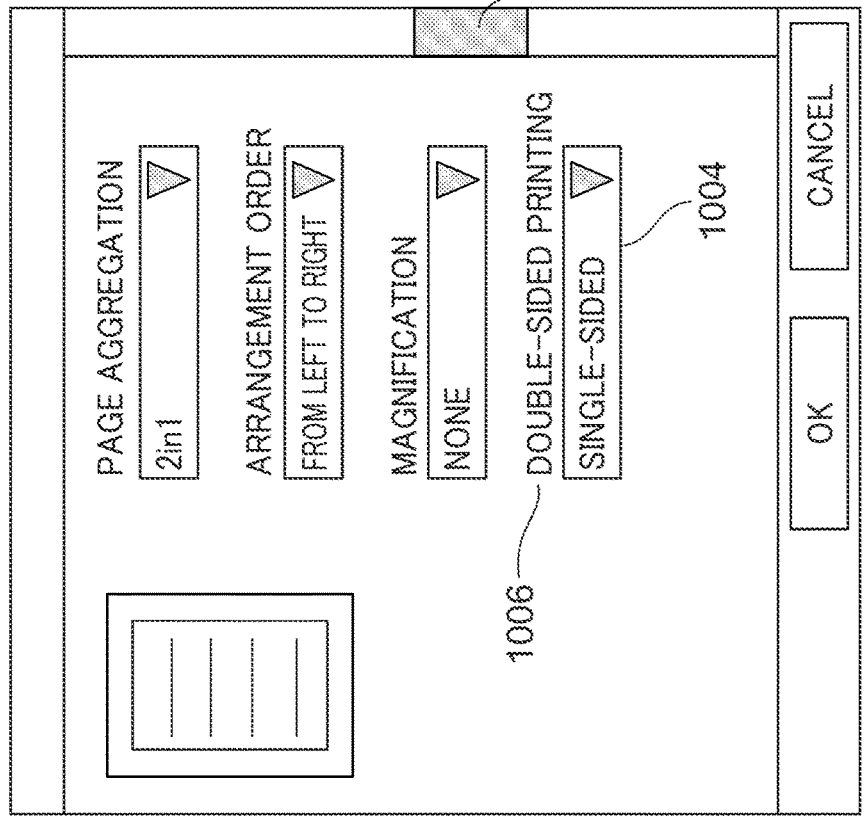
Figure 10E:
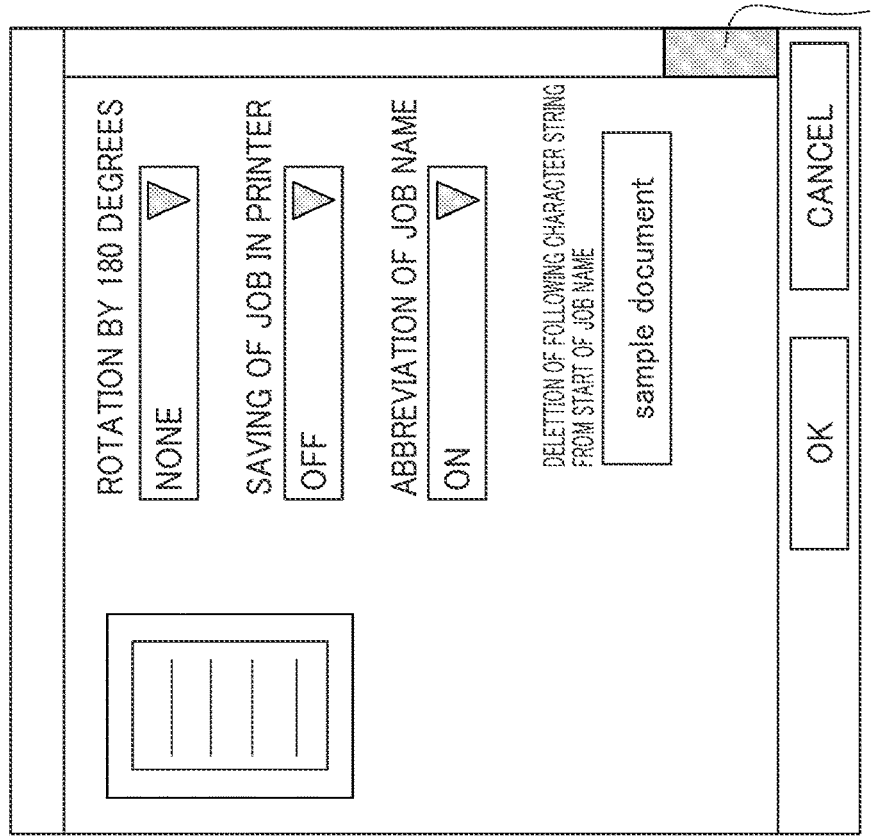
Figure 10H:
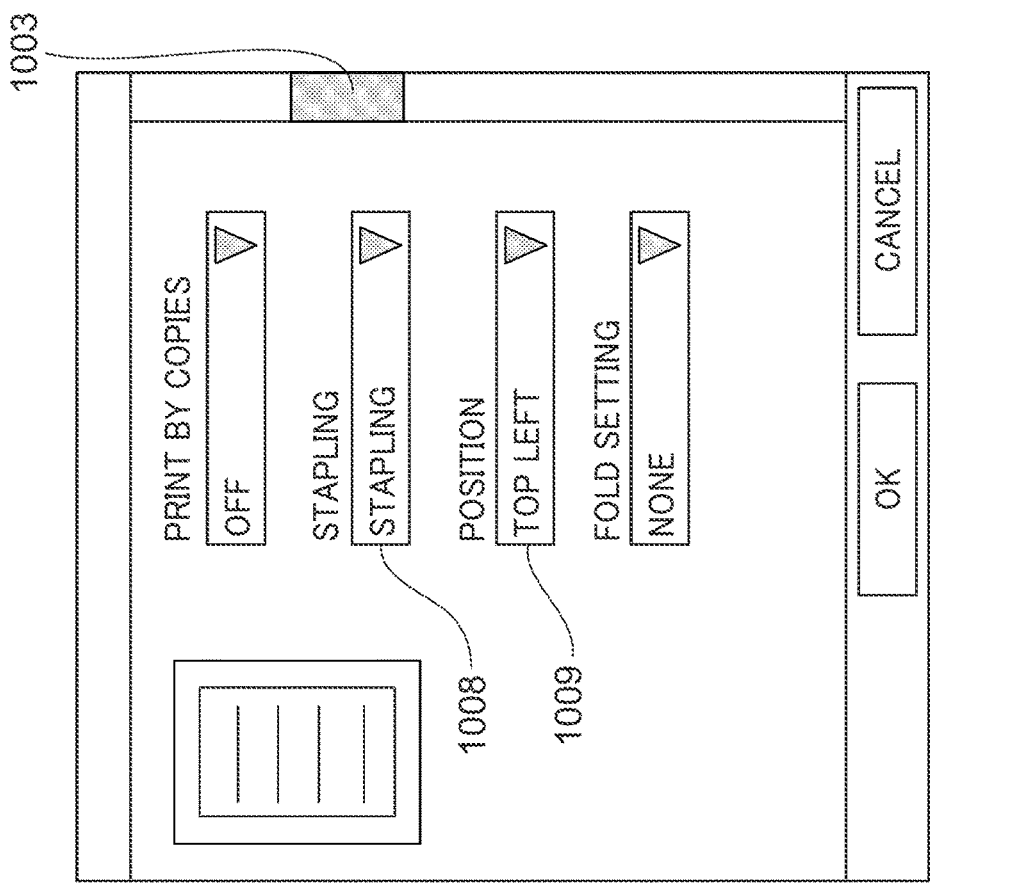
Figure 10G:
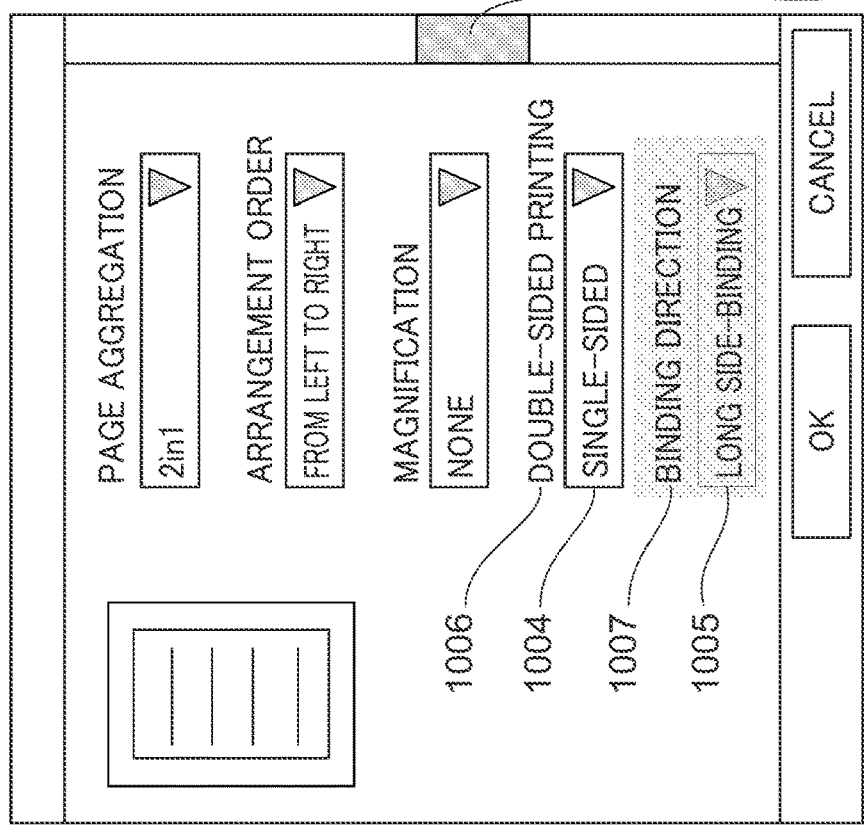
Figure 10I:
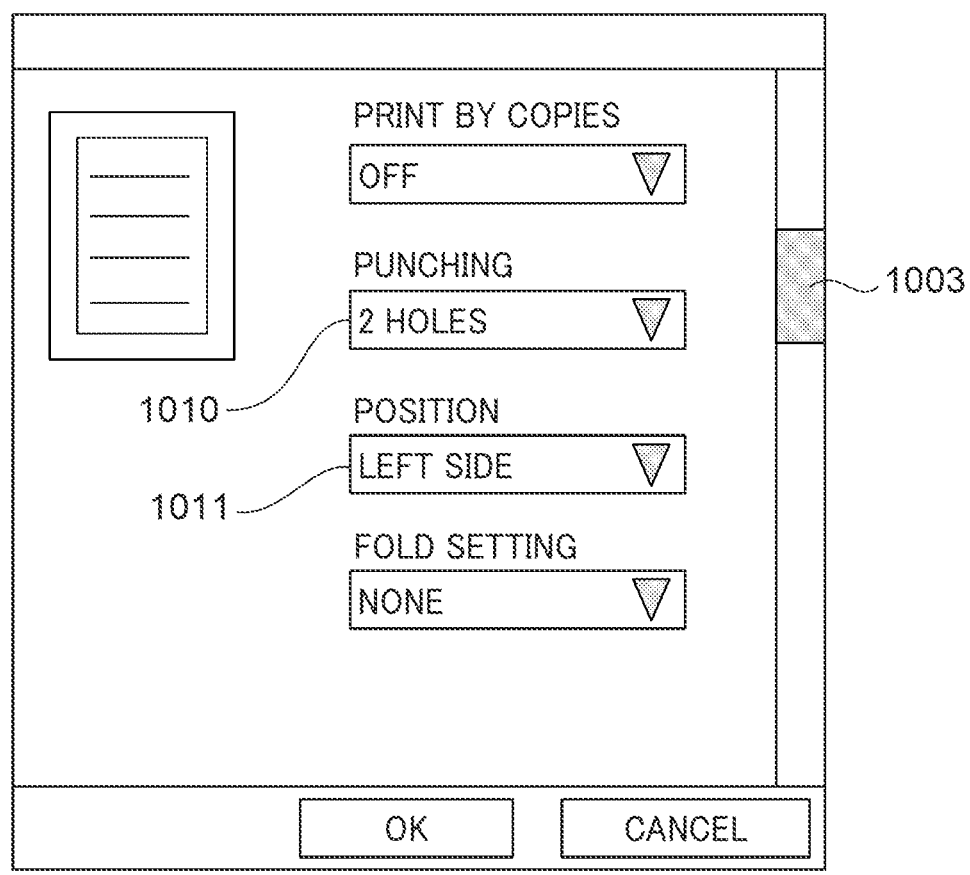

In the present embodiment, the print settings extension application 312 can sort and display these three attribute values 502 into the attribute values 502 relevant to each other and the attribute values 502 as the remainder obtained by excluding the attribute values 502 relevant to each other (second display). More specifically, as shown in FIGS. 10C and 10G, "short-side binding" and "long-side binding" which are the attribute values 502 relevant to each other are displayed in a combo box (second combo box) 1005 in a selectable state, separately from the item name 501. To the combo box 1005, a name 1007 of "binding direction" is added. As shown in FIGS. 10C, 10F, and 10G, "single-sided" which is the remainder of the attribute values 502 is displayed in a combo box (first combo box) 1004 together with "double-sided" in a selectable state. To the combo box 1004, a name 1006 of "double-sided printing" is added. Although the combo box 1004 and the combo box 1005 are arranged vertically in the present embodiment, the arrangement is not limited to this, and they are only required to be arranged at different locations from each other. Note that in the present embodiment, the determination of whether or not the attribute values are related to each other is determined based on e.g. whether or not information on "binding" is included. This criterion is stored in e.g. the print settings extension application 312 in advance.

This second display is displayed by the above-described OS standard driver, and differently from the first display which is rarely seen by general users, the second display is often seen by general users, that is, the second display is close to a familiar display. With this, the user can operate the print settings screen 100 without a feeling of wrongness, and it is possible to prevent lowering of the operability when printing is performed.

Further, as shown in FIG. 10C, in a case where "double-sided" is selected in the combo box 1004, one of "short-side binding" and "long-side binding" can be selected in the combo box 1005. On the other hand, as shown in FIGS. 10F and 10G, in a case where "double-sided" is not selected but "single-sided" is selected in the combo box 1004, selection of "short-side binding" and "long-side binding" in the combo box 1005 is disabled. Note that the method of disabling the selection in the combo box 1005 is not particularly limited, but for example, a method of inhibiting the display of the combo box 1005 (see FIG. 10F) and a method of displaying the combo box 1005 in a grayed-out state (see FIG. 10G) can be used. Note that the display can be inhibited by setting "Visibility" to "Collapsed". The grayed-out display can be performed by using the property of IsEnabled and setting the same to "false". Thus, it is possible to switch between enabling and disabling of selection in the combo box 1005 according to a selected option in the combo box 1004. This enables the user to quickly grasp whether or not the user can perform an operation on the combo box 1005.

Further, as shown in FIG. 10C, the combo box 1004 and the combo box 1005 can be collectively displayed on one screen. This enables the user to quickly shift to the operation on the combo box 1005 after the operation on the combo box 1004. Differently from the display shown in FIG. 10C, in a case where the combo box 1004 and the combo box 1005 are displayed e.g. over two screens, the combo box 1004 and the combo box 1005 can be sequentially displayed by a scroll operation. In this case as well, after the operation on the combo box 1004, the user can quickly shift to the operation on the combo box 1005.

Further, in a case where the attribute values 502 relevant to each other are not included in the plurality of attribute values 502, the second display can be omitted. This makes it possible to prevent the second display from being unnecessarily displayed.

Although the case where the print settings extension application 312 is applied to double-sided printing has been described by way of example, the print settings extension application 312 can also be applied to the other item names 501, such as stapling and punching. Stapling is described as "psk: Job StapleAllDocuments" on the capability information, and has e.g. "psk: StapleTopLeft" as its Option. Further, punching is described as "psk: JobHolePunch" in the capability information, and has e.g. "psk: HolePunchLeft" as its Option. These can also be separated and displayed as in the case of double-sided printing.

For example, in a case where the item name 501 is stapling, the attribute values 502 are classified into "stapling: ON/OFF", and "upper left", "upper right", "lower left", "lower right", "left side", "right side", "upper side", and "lower side", which are related to the stapling positions (see FIG. 10H). The attribute value "stapling: ON/OFF" is disposed in a combo box 1008, and the attribute values "upper left" and so forth are disposed in a combo box 1009. Further, in a case where the item name 501 is punching, the attribute values 502 are classified into "2 holes", "3 holes", "4 holes", "multiple holes", and "none", which are related to the number of punched holes, and "left side", "right side", "upper side", and "lower side", which are related to the binding direction (see FIG. 10I). The attribute values "2 holes" and so forth are disposed in a combo box 1010, and the attribute values "left side" and so forth are disposed in a combo box 1011.

In the process shown in FIG. 13, in the case of stapling, in the step S1302, the print settings extension application 312 generates "stapling: ON/OFF" and "stapling position" as UI display objects. In the step S1303, the print settings extension application 312 generates a feature management object by referring to the capability information held by the OS 313. At this time, in a case where the selected Option of "psk: Job StapleAllDocuments" is "psk: None", "Visibility" of the feature management object of "upper left" and the like as the stapling positions is set to "Collapsed". In the other cases, "Visibility" is set to "Visible". In the process in FIG. 14, the determinations in the step S1402 and the step S1406 are replaced by determination of "whether or not stapling is set to ON". Further, "binding direction" in the step S1403 and the step S1407 is replaced by "the stapling position". As a result, the print settings extension application 312 can perform the same processing operations in the case of stapling as in the case of double-sided printing.

Further, in the case of punching, in the step S1302, as the UI display objects, the print settings extension application 312 generates "2 holes" and so forth, as the numbers of holes, and "left side" and so forth, as the stapling directions. In the step S1303, the print settings extension application 312 generates a feature management object by referring to the capability information held by the OS 313. At this time, in a case where the selected Option of "psk: JobHolePunch" is "psk: None", "Visibility" of the stapling direction, such as "left side", is set to "Collapsed". In the other cases, "Visibility" is set to "Visible". Further, the determinations in the steps S1402 and S1406 are replaced by determination of 'whether or not the number of punched holes is set to "2"' and the like. With this, the print settings extension application 312 can perform the same processing operations in the case of punching as in the case of double-sided printing. Thus, similar to the case of double-sided printing, in the case where the item name is stapling, punching, or the like, the user can operate the print settings screen 100 without a feeling of wrongness and prevent lowering of the operability when printing is performed.

As described hereinabove, there are a plurality of item names 501, and the print settings extension application 312 may change the order of display of these item names on the print settings screen 100 (see FIGS. 10A to 10I) to a priority order based on the use frequency. For example, in a case where among double-sided printing, stapling, and punching, the use frequency of double-sided printing is the highest, and the use frequency of stapling and the use frequency of punching follow in the mentioned order, double-sided printing is displayed at the top of the print settings screen 100 to the extent possible. Then, as the screen is scrolled downward, stapling is displayed, and then punching is displayed. With this, the operability (usability) of the print settings screen 100 is improved.

Figure 15:
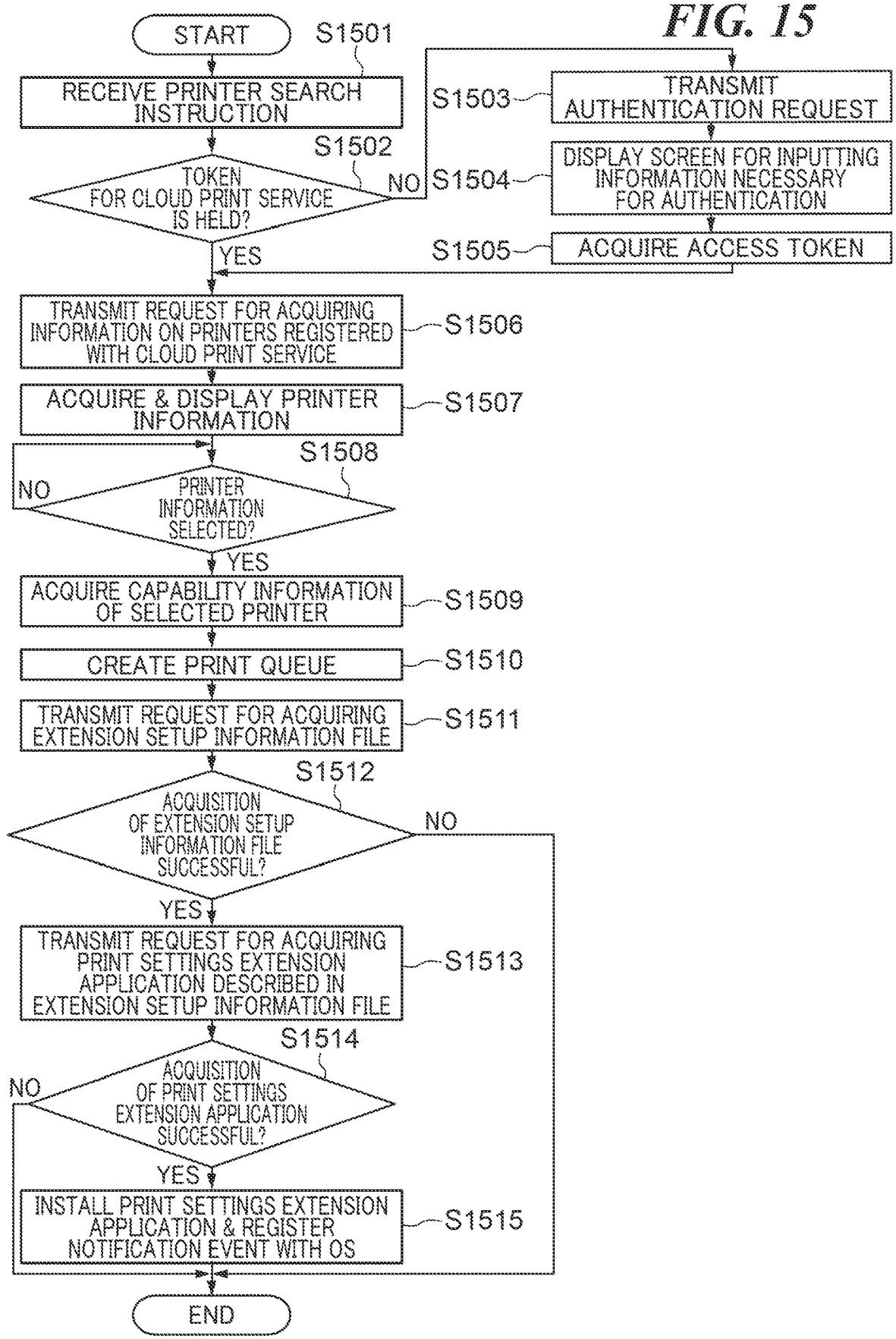
FIG. 15 is a flowchart of a process performed by the OS, up to a step for installing the print settings extension application in the client terminal.

FIG. 15 is a flowchart of a process performed by the OS, up to a step for installing the print settings extension application in the client terminal. The program of the process shown in FIG. 15 is stored in the storage section 214 of the client terminal 101. This program is executed by the CPU 212 of the client terminal 101. As shown in FIG. 15, in a step S1501, the CPU 212 displays the screen 400 shown in FIG. 4 on the display section 216 and receives a printer search instruction from the user. The CPU 212 receives a printer search instruction when the object 401 on the screen 400 is selected.

In a step S1502, the CPU 212 determines whether or not the access token for the cloud print service 321 is stored (held). The client terminal 101 stores an access token for acquiring information from the cloud print service 321 for each user who logs in to the client terminal 101. The CPU 212 can determine whether or not an access token associated with the user who has logged in the client terminal 101 is stored. If it is determined in the step S1502 that the access token is stored, the process proceeds to a step S1506. On the other hand, if it is determined in the step S1502 that the access token is not stored, the process proceeds to a step S1503.

In the step S1503, the CPU 212 transmits an authentication request to the cloud print service 321. Then, the CPU 212 receives a URL from the cloud print service 321, for displaying a screen on which information necessary for this authentication (hereinafter referred to as the "authentication information") is to be input.

In a step S1504, the CPU 212 accesses the URL received in the step S1503 and displays a screen on which the authentication information is to be input. Examples of the authentication information include a user ID (user identifier) and a password.

In a step S1505, the CPU 212 transmits the authentication information to the cloud print service 321 to acquire an access token, and the process proceeds to the step S1506. Note that in a case where the authentication to the cloud print service 321 fails, the CPU 212 cannot acquire an access token, and hence the present process is terminated.

In the step S1506, the CPU 212 of the client terminal 101 transmits a request to the cloud print service 321 based on the access token, for acquiring information of printers registered with the cloud print service 321. The cloud print service 321 selects information on printers which can be used by the user identified by the access token received in the step S1506 and transmits the selected printer information to the client terminal 101. In the present embodiment, as the printer information, printer names registered in association with the printers are used.

In a step S1507, the CPU 212 displays the printer information acquired from the cloud print service 321 in the step S1506 on the display section 216 of the client terminal 101. With this display, the printer information is displayed in a list in the area 402 of the screen 400.

In a step S1508, the CPU 212 determines whether or not one of the printer information items displayed in the step S1507 has been selected. If it is determined in the step S1508 that one of the printer information items has been selected, the process proceeds to a step S1509. On the other hand, if it is determined in the step S1508 that the printer information has not been selected, the process repeats the step S1508, that is, the step S1508 is repeatedly executed.

In the step S1509, the CPU 212 transmits a request for acquiring the capability information of the printer selected in the step S1508 to the cloud print service 321. Here, the CPU 212 inquires the setting items registered with the OS 313 in advance from the cloud print service 321. Further, the OS 313 acquires information on the HW ID and the like of the printer selected in the step S1508.

In a step S1510, the CPU 212 updates the printer capability information stored in the client terminal 101 based on the information acquired from the cloud print service 321 in the step S1509 and creates a print queue.

In a step S1511, the CPU 212 transmits a request for acquiring the extension setup information file 700 to the online support service 351. This acquisition request includes the HW ID of the printer.

In a step S1512, the CPU 212 determines whether or not acquisition of the extension setup information file 700 in the step S1511 is successful. If it is determined in the step S1512 that the acquisition is successful, the process proceeds to a step S1513. On the other hand, if it is determined in the step S1512 that the acquisition is not successful, i.e., has failed, the present process is terminated.

In the step S1513, the CPU 212 transmits a request for acquiring the print settings extension application 312 included in the extension setup information file 700 acquired in the step S1512 to the application management service 331. More specifically, the CPU 212 acquires the application identifier of the print settings extension application 312 from the extension setup information file 700. Then, the CPU 212 transmits the request for acquiring the print settings extension application 312 to the application management service 331 by designating the application identifier.

In a step S1514, the CPU 212 determines whether or not acquisition of the print settings extension application 312 is successful. If it is determined in the step S1514 that the acquisition is successful, the process proceeds to a step S1515. On the other hand, if it is determined in the step S1514 that the acquisition is not successful, the present process is terminated.

In the step S1515, the CPU 212 installs the print settings extension application 312 acquired in the step S1514 and registers the application identifier of the print settings extension application 312 in association with the print queue, followed by terminating the present process. With this, the print settings extension application 312 becomes available on the client terminal 101. Further, in the step S1515, registration of an event indicating the timing of notification to the OS 313 is performed. It is assumed here that the notification is performed when the print queue associated with the print settings extension application 312 is selected on the print settings initial screen 1100 displayed by the document creation application 315.

Figure 16:
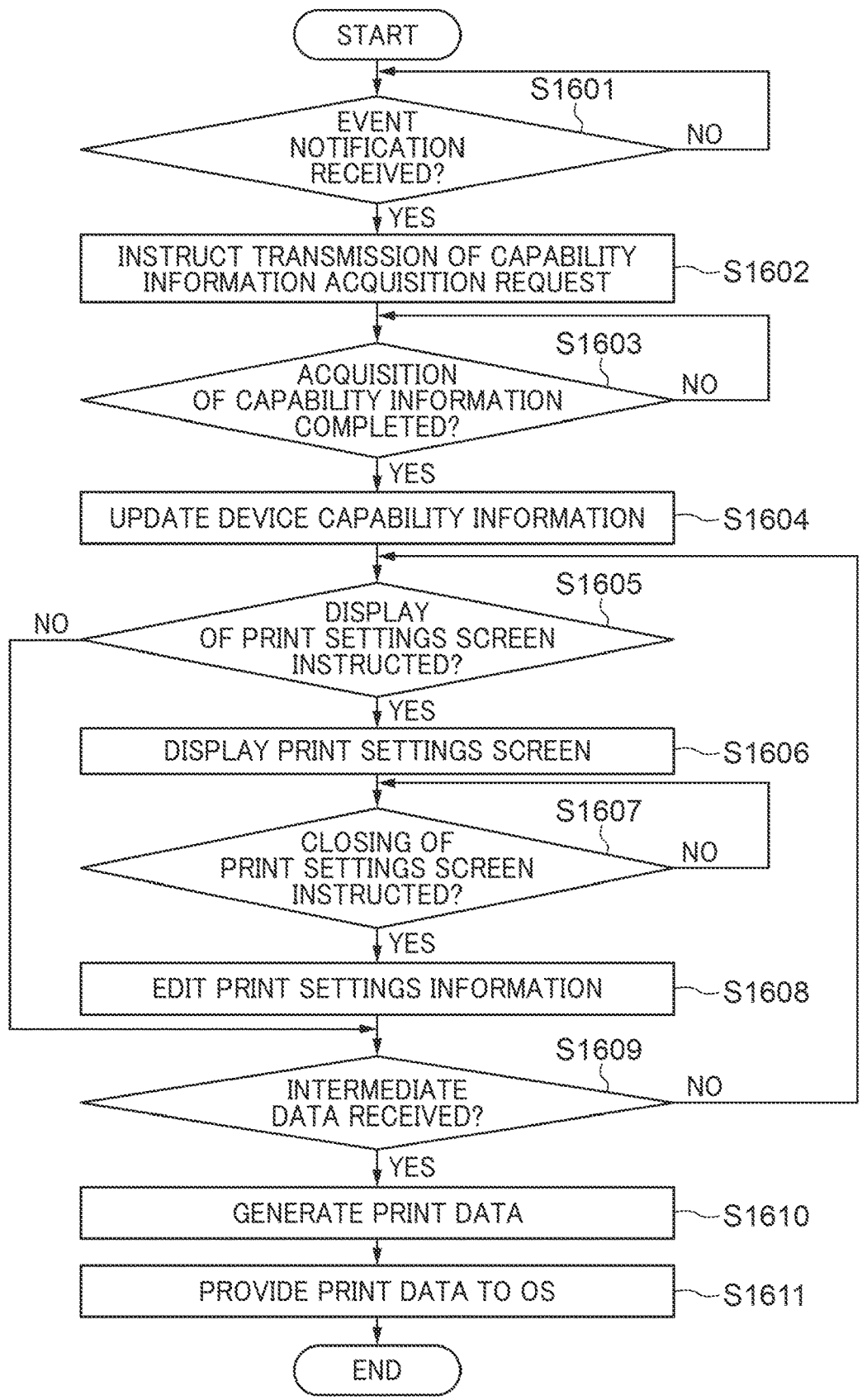
FIG. 16 is a flowchart of a process performed when print setting is performed by using the print settings extension application to generate print data.

FIG. 16 is a flowchart of a process performed when the setting of print settings is performed by the print settings extension application and print data is generated. The program for executing the process in FIG. 16 is stored in the print settings extension application 312. This program is loaded into the memory 213 of the client terminal 101 and executed by the CPU 212. As shown in FIG. 16, in a step S1601, the CPU 212 determines whether or not a notification of the event registered in the step S1515 has been received. If it is determined in the step S1601 that the notification of the event has been received, the process proceeds to a step S1602. On the other hand, if it is determined in the step S1601 that the notification of the event has not been received, the process repeats the step S1601.

In the step S1602, the CPU 212 transmits a request for acquiring the capability information to the cloud print service 321. More specifically, the CPU 212 transmits a request for acquiring the capability information to the cloud print service 321 with respect to the setting items set in the print settings extension application 312. Here, the capability information is also acquired with respect to setting items which have not been acquired in the step S1506 of FIG. 15.

In a step S1603, the CPU 212 determines whether or not acquisition of the capability information in the step S1602 has been completed. If it is determined in the step S1603 that the acquisition has been completed, the process proceeds to a step S1604. On the other hand, if it is determined in the step S1603 that the acquisition has not been completed, the process repeats the step S1603.

In the step S1604, the CPU 212 updates the device capability information with the capability information acquired in the step S1603. With this update, the capability information is stored in the client terminal 101 also with respect to setting items which have not been acquired by the OS 313.

In a step S1605, the CPU 212 determines whether or not an instruction for displaying the print settings screen (print settings screen 100), provided by the print settings extension application 312, has been received. The "screen display instruction provided by the print settings extension application 312" is e.g. an instruction based on an operation of selecting the object 1104 on the print settings initial screen 1100, but this is not limitative. If it is determined in the step S1605 that the screen display instruction has been received, the process proceeds to a step S1606. On the other hand, if it is determined in the step S1605 that the screen display instruction has not been received, the process proceeds to a step S1609.

In the step S1606, the CPU 212 displays the print settings screen 100 shown in FIGS. 10A to 10I based on the printer device information updated in the step S1604. With this, the CPU 212 can receive a user operation for selecting a setting via the print settings screen 100.

In a step S1607, the CPU 212 determines whether or not an instruction for terminating (closing) the display of the print settings screen 100 has been received. If it is determined in the step S1607 that an instruction for terminating the display has been received, the process proceeds to a step S1608. On the other hand, if it is determined in the step S1607 that an instruction for terminating the display has not been received, the process repeats the step S1607.

In the step S1608, the CPU 212 edits the print settings information using the settings selected on the print settings screen 100. Then, the CPU 212 terminates the display of the print settings screen 100.

In the step S1609, the CPU 212 determines whether or not the print settings extension application 312 has received the intermediate data from the OS 313. If it is determined in the step S1609 that the intermediate data has been received, the process proceeds to a step S1610. On the other hand, if it is determined in the step S1609 that the intermediate data has not been received, the process returns to the step S1605.

In the step S1610, the CPU 212 generates print data based on the intermediate data received in the step S1609 and the print capability information (capability information). Further, the CPU 212 generates image data in a predetermined format based on the intermediate data and the print settings information. Further, the CPU 212 generates print capability information described using the attribute values 502 defined by the IPP, based on the print settings information. Not only the attribute values 502 defined by the IPP, but also other information can be included in this print capability information as required. With this, item names 501 and attribute values 502, specifically defined by the printer vendor, can also be included in the print capability information.

In a step S1611, the CPU 212 provides the print data generated in the step S1610 to the OS 313. The OS 313 transmits the received data to the cloud print service 321 via the print queue. With this, the cloud print-compatible printer 104 can perform printing based on the print data generated in the step S1610.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140192 filed Sep. 2, 2022, which is hereby incorporated by reference herein in its entirety.

What is claimed is:

1. An information processing apparatus comprising:
    at least one processor; and
    a memory coupled to the at least one processor, the memory having instructions that, when executed by the processor, perform the operations as:
    an acquisition unit configured to acquire capability information related to print capability from a server that provides a cloud print service or from a printer; and
    a display control unit configured to display a screen,
    wherein the capability information has a hierarchical structure including at least one item of first information and a plurality of items of second information belonging to the item of the first information, and
    wherein the display control unit can perform first display for collectively displaying the item of the first information and the plurality of items of the second information, and second display for displaying the plurality of items of the second information in a state sorted into groups of items relevant to each other of the second information.

2. The information processing apparatus according to claim 1, wherein in the second display, each group of relevant items of the second information items is displayed separately from the first information.

3. The information processing apparatus according to claim 1, wherein among the plurality of items of the second information, the display control unit displays the remaining items of the second information, obtained by excluding the relevant items of the second information, together with the first information.

4. The information processing apparatus according to claim 3, wherein information representing relevant items of the second information and the remaining item of the second information are displayed in a first combo box displayed together the first information, in a selectable state, and
    wherein the relevant items of the second information are displayed in a second combo box arranged at a location different from the first combo box, in a selectable state.

5. The information processing apparatus according to claim 4, wherein in a case where the information representing the relevant items of the second information is selected in the first combo box, the display control unit enables selection from the relevant items of the second information in the second combo box, whereas in a case where the information representing the relevant items of the second information is not selected in the first combo box, the display control unit disables selection from the relevant items of the second information in the second combo box.

6. The information processing apparatus according to claim 4, wherein the display control unit collectively displays the first combo box and the second combo box.

7. The information processing apparatus according to claim 4, wherein the display control unit displays the first combo box and the second combo box by a scroll operation.

8. The information processing apparatus according to claim 1, wherein in a case where there are no relevant items of the second information in the plurality of items of the second information, the display control unit omits the second display.

9. The information processing apparatus according to claim 1, wherein the instructions, when executed by the processor, perform the operations further as an operation unit configured to perform an operation for changing a display state from a state in which the first display is performed to a state in which the second display is performed.

10. The information processing apparatus according to claim 1, wherein the acquisition unit determines whether or not to acquire the capability information according to a type of the first information.

11. The information processing apparatus according to claim 1, wherein the first information is items defined by an IPP (Internet Printing Protocol), and the second information is attribute values defined by the IPP.

12. The information processing apparatus according to claim 11, wherein the items include double-sided printing, and the attribute values include enabling/disabling of the double-sided printing, short-side binding in the double-sided printing, and long-side binding in the double-sided printing.

13. A method of controlling an information processing apparatus that processes information, comprising:
    acquiring capability information related to print capability from a server that provides a cloud print service or from a printer; and
    displaying a screen,
    wherein the capability information has a hierarchical structure including at least one item of first information and a plurality of items of second information items belonging to the item of the first information, and
    wherein the displaying of the screen can be executed by first display for collectively displaying the item of the first information and the plurality of items of the second information, and second display for displaying the plurality of items of the second information in a state sorted into groups of items relevant to each other of the second information.

14. A non-transitory computer-readable storage medium storing a print settings application installed in an information processing apparatus that processes information,
    the print settings application causing the information processing apparatus to:
    acquire capability information related to print capability from a server that provides a cloud print service or from a printer; and
    display a screen,
    wherein the capability information has a hierarchical structure including at least one item of first information and a plurality of items of second information belonging to the item of the first information, and
    wherein the displaying of the screen can be executed by first display for collectively displaying the item of the first information and the plurality of items of the second information, and second display for displaying the plurality of items of the second information in a state sorted into groups of items relevant to each other of the second information.

15. A non-transitory computer-readable storage medium storing a program for causing a computer to execute a method of controlling an information processing apparatus that processes information,
   wherein the method comprises:
   acquiring capability information related to print capability from a server that provides a cloud print service or from a printer; and
   displaying a screen,
   wherein the capability information has a hierarchical structure including at least one item of first information and a plurality of items of second information items belonging to the item of the first information, and
   wherein the displaying of the screen can be executed by first display for collectively displaying the item of the first information and the plurality of items of the second information, and second display for displaying the plurality of items of the second information in a state sorted into groups of items relevant to each other of the second information.

* * * * *